US011936993B2

(12) United States Patent
Desai et al.

(10) Patent No.: US 11,936,993 B2
(45) Date of Patent: Mar. 19, 2024

(54) METHODS AND SYSTEMS FOR PRESENTING IMAGE CONTENT TO A SUBJECT IN A DEFORMABLE ELECTRONIC DEVICE

(71) Applicant: Motorola Mobility LLC, Chicago, IL (US)

(72) Inventors: Rahul Bharat Desai, Hoffman Estates, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 133 days.

(21) Appl. No.: 17/704,447

(22) Filed: Mar. 25, 2022

(65) Prior Publication Data
US 2023/0308775 A1 Sep. 28, 2023

(51) Int. Cl.
H04N 23/90 (2023.01)
G06T 7/70 (2017.01)
G06V 40/10 (2022.01)
H04N 23/53 (2023.01)
H04N 23/611 (2023.01)
H04N 23/63 (2023.01)

(52) U.S. Cl.
CPC .............. H04N 23/90 (2023.01); G06T 7/70 (2017.01); G06V 40/10 (2022.01); H04N 23/53 (2023.01); H04N 23/611 (2023.01); H04N 23/632 (2023.01); G06T 2207/30201 (2013.01)

(58) Field of Classification Search
CPC ...... H04N 23/90; H04N 23/53; H04N 23/611; H04N 23/632; G06T 7/70; G06T 2207/30201; G06V 40/10
See application file for complete search history.

(56) References Cited

U.S. PATENT DOCUMENTS

2021/0112196 A1 4/2021 Iyer et al.
2022/0070363 A1 3/2022 Machuca et al.

OTHER PUBLICATIONS

Wayback Machine of Samsung Director's View app (Year: 2021).*
Youtube video of review of Samsung Galaxy Z Flip 3 using Directors View App (Year: 2021).*
Samsung Galaxy Z Flip 3 images (Year: 2021).*
(Continued)

Primary Examiner — Twyler L Haskins
Assistant Examiner — Angel L Garces-Rivera
(74) Attorney, Agent, or Firm — Philip H. Burrus, IV

(57) ABSTRACT

A method in an electronic device includes detecting, with one or more processors, initiation of an image capture operation using an image capture device situated on a first surface of the electronic device and having a first field of view extending away from the first surface in a first direction. In response to detecting the initiation of the image capture operation, the method includes actuating a second image capture device situated on a second surface of the electronic device and having a second field of view extending away from the second surface in a second direction. The method then captures image content with the second image capture device and presenting the image content on a display situated on the first surface of the electronic device. Thereafter, the one or more processors capture at least one image with the first image capture device.

20 Claims, 12 Drawing Sheets

(56) References Cited

OTHER PUBLICATIONS

"Manage Quickview Content for a Multi-Display Device", Application as filed for U.S. Appl. No. 17/209,146, filed Mar. 22, 2021.
"Samsung Galaxy Z Fold2", Unknown exact availability date but believed to be prior to filing of present application; Viewed online May 6, 2021 at https://www.samsung.com/us/smartphones/galaxy-z-fold2-5g/.

* cited by examiner

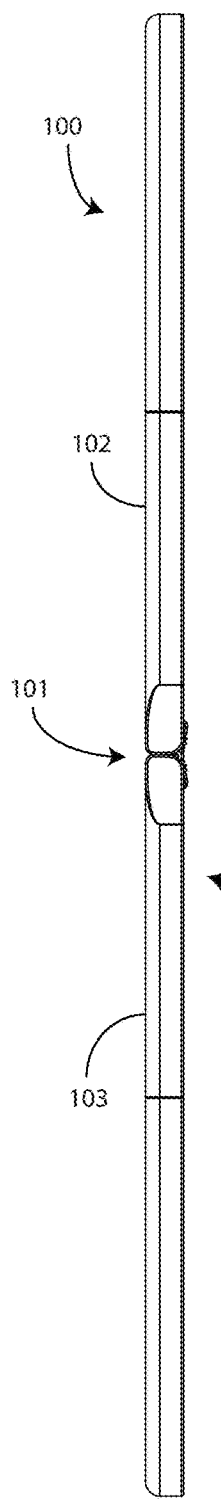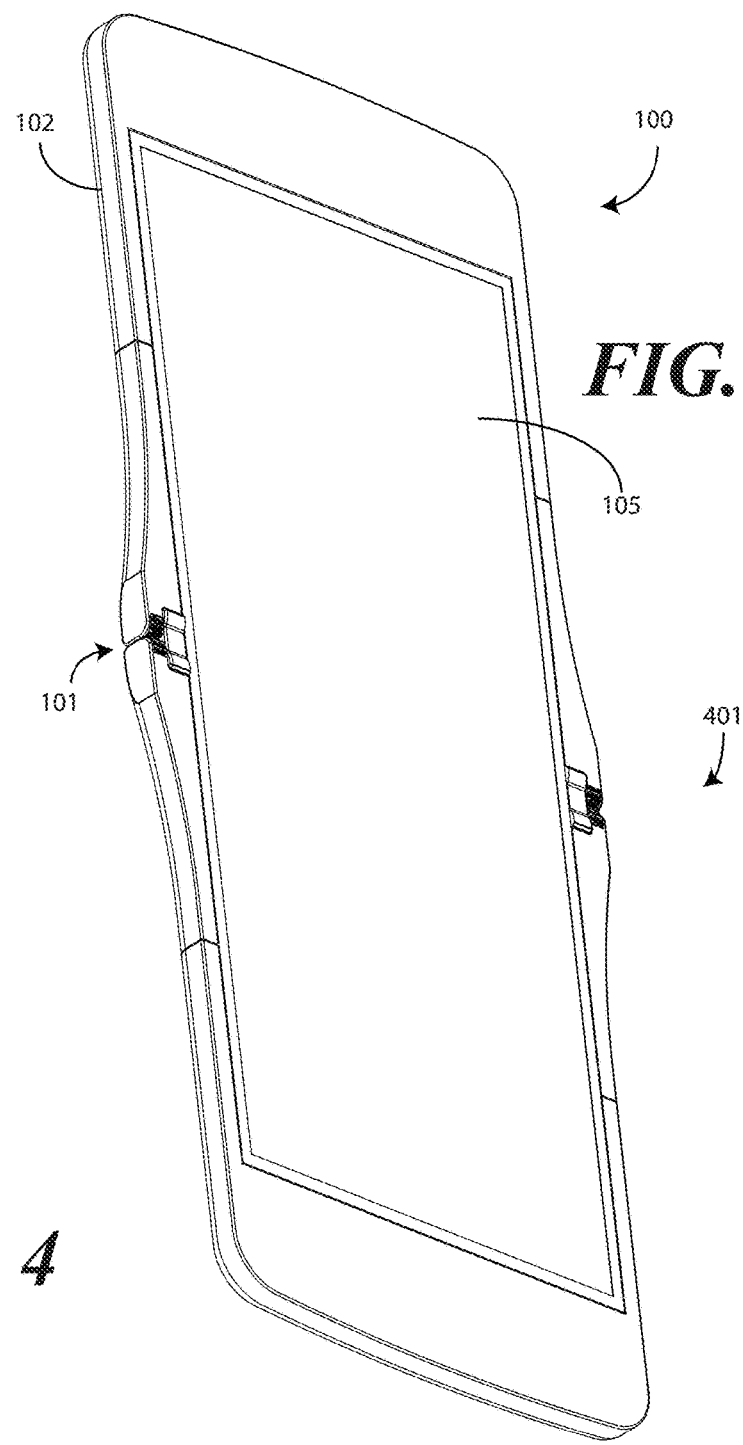

METHODS AND SYSTEMS FOR PRESENTING IMAGE CONTENT TO A SUBJECT IN A DEFORMABLE ELECTRONIC DEVICE

BACKGROUND

Technical Field

This disclosure relates generally to methods and systems for electronic devices having imagers, and more particularly to methods and systems for physically deformable electronic devices having imagers.

Background Art

Mobile electronic communication devices, such as mobile telephones, smart phones, gaming devices, and the like, have become ubiquitous. These devices are used for a variety of purposes, including voice and video telecommunications, sending and receiving text and multimedia messages, Internet browsing, electronic commerce, and social networking. Many are equipped with imagers that can be used to capture images. It would be advantageous to have improved user interfaces to adapt performance, thereby enhancing the image capture process.

BRIEF DESCRIPTION OF THE DRAWINGS

FIG. 4 illustrates one explanatory electronic device with a first device housing and a second device housing pivoted to an axially displaced open position in accordance with one or more embodiments of the disclosure.

FIG. 5 illustrates another view of one explanatory electronic device with a first device housing and a second device housing pivoted to an axially displaced open position in accordance with one or more embodiments of the disclosure.

Figure 1:
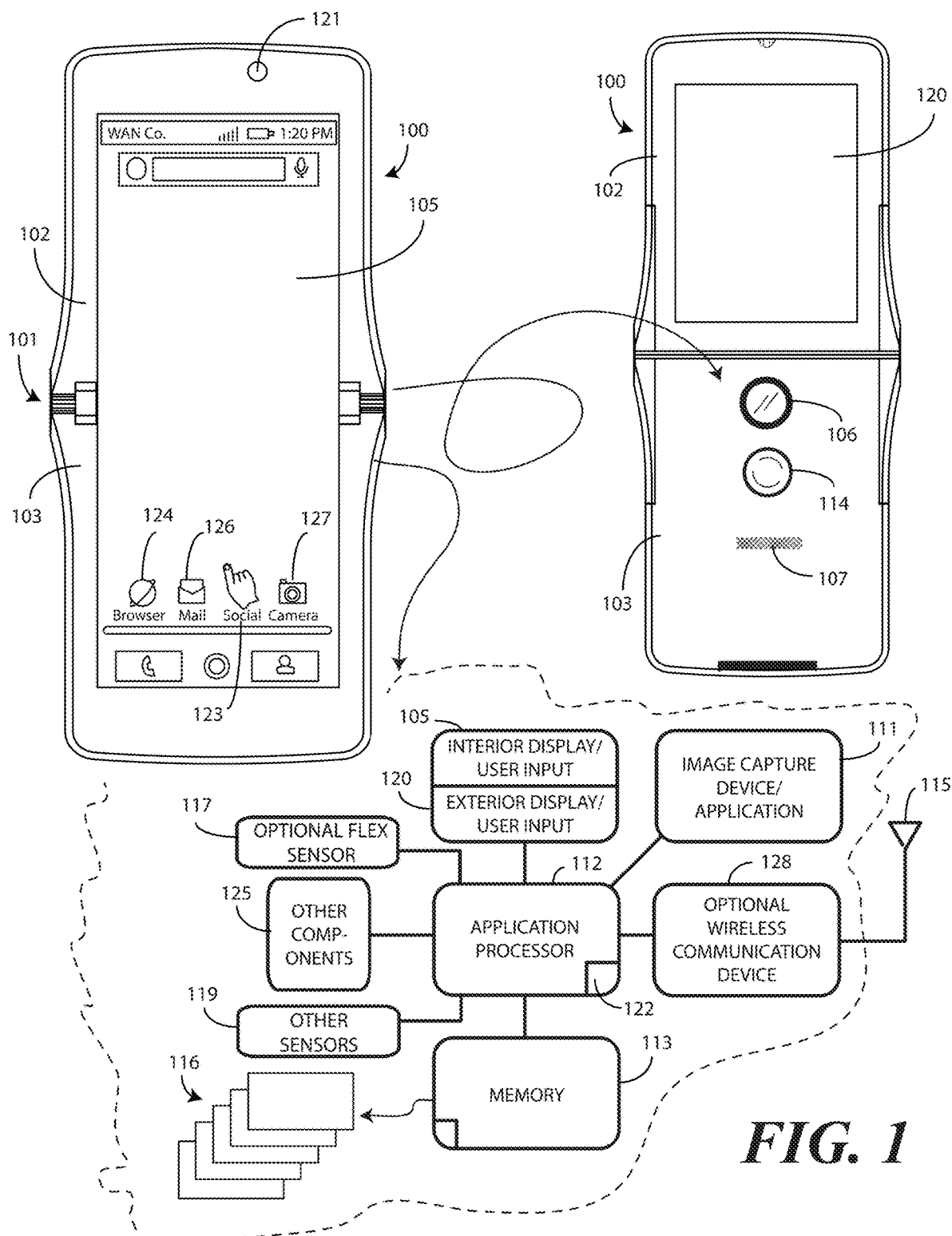
FIG. 1 illustrates one explanatory electronic device, along with an explanatory schematic block diagram, in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting the initiation of an image capture operation using a front-facing image capture device in an electronic device with two oppositely facing image capture devices and, in response, capturing image content with a rear-facing image capture device and presenting that image content on a front-facing display that can be seen by a subject before and/or during the capture of one or more images using the front-facing image capture device. Process descriptions or blocks in a flow chart can be modules, segments, or portions of code that implement specific logical functions of a machine or steps in a process, or alternatively that transition specific hardware components into different states or modes of operation. Alternate implementations are included, and it will be clear that functions may be executed out of order from that shown or discussed, including substantially concurrently or in reverse order, depending on the functionality involved.

It will be appreciated that embodiments of the disclosure described herein may be comprised of one or more conventional processors and unique stored program instructions that control the one or more processors to implement, in conjunction with certain non-processor circuits, some, most, or all of the functions of capturing image content with a second image capture device in response to initiation of an image capture operation using a first image capture device and presenting that image content on a front-facing display prior to and/or during the capture of one or more images using the first image capture device. The non-processor circuits may include, but are not limited to, imaging devices, flash devices, microphones, loudspeakers, acoustic amplifiers, digital to analog converters, signal drivers, clock circuits, power source circuits, and user input devices. As such, these functions may be interpreted as steps of a method to perform the presentation of image content on a front-facing display, which was captured by a rear-facing image capture device, when an image capture operation is initiated and/or when an image capture operation occurs after a deformable electronic device is transitioned from a closed position to an axially displaced open position.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device having a hinged housing, improve the functioning of the electronic device itself by facilitating the presentation of image content depicting the photographer during image capture operations to improve the overall user experience to overcome problems specifically arising in the realm of the technology associated with image capture in electronic devices having multiple displays.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a deformable electronic device having a first housing portion that is pivotable relative to a second housing portion between a closed position that conceals a first image capture device and a first display while leaving a second image capture device and a second display exposed, and an axially displaced open position where each of the first image capture device, the second image capture device, the first display, and the second display are exposed. In one or more embodiments, the first housing portion is a first device housing, while the second housing portion is a second device housing that is joined to the first device housing by a hinge such that the first device housing is pivotable relative to the second device housing about the hinge between the axially displaced open position and the closed position. In other embodiments, the first housing portion is simply a section of a deformable device housing that is bendable at a deformation portion such that the first housing portion can pivot relative to a second housing portion about the deformable portion between the axially displaced open position and the closed position. Other configurations will be described below. Still others will be obvious to those of ordinary skill in the art having the benefit of this disclosure.

In one or more embodiments, one or more sensors of the electronic device detect that the electronic device is transitioned to the axially displaced open position. In one or more embodiments, when this occurs and one or more processors detect the initiation of an image capture operation using the second image capture device, the one or more processors cause the first image capture device to capture image content and present the image content on the second display prior to capturing at least one other image using the second image capture device. In short, if a photographer is facing the first image capture device and a subject is facing the second image capture device, this method allows image content depicting the photographer to be presented to the subject before and/or when the second image capture device captures images of the subject.

This "presentation of images of the photographer before or during the capture if images of the subject" system offers numerous advantages. Illustrating by example, if the photographer is the parent of a crying child, and the parent knows just the right face to make to cause the child to laugh, the child will be able to see this face on the front-facing display despite the fact that the electronic device is positioned between parent and child. Where the image content of the photographer is video content, the parent can even use embodiments of the disclosure to communicate with and provide guidance to the child as well.

In one or more embodiments, the one or more processors apply a filter to the image content that alters depictions of the photographer prior to presenting the image content on the display facing the subject. In one or more embodiments, this filter is funny, interesting, or humorous, and is intended to capture the attention of the subject. Illustrating by example, the filter may make the depiction of the photographer have visible characteristics of an animal, such as a dog or cat.

By being deformable, electronic devices configured in accordance with embodiments of the disclosure have a unique form factor that provides a large display on both the front side and the rear side of the electronic device. Embodiments of the disclosure utilize these displays so that image content depicting a photographer (or other items positioned to the rear of the electronic device) can be presented to a subject before or during the capture of one or more images of the subject. In one or more embodiments, one or more processors utilize the rear-facing image capture device to capture one or more images of the photographer and then apply an augmented reality face filter in real time. This altered image can then be placed on the front-facing display that is visible to a subject to evoke a smile or laugh by the subject. Advantageously, the image content presented on the front-facing display is personalized in the fact that it depicts the actual face of the photographer regardless of whether a filter is applied thereto.

In one or more embodiments, a method includes detecting, with one or more sensors, a geometric form factor of an electronic device carrying multiple camera systems and multiple displays situated on the opposite sides of the device housing being transitioned to an axially displaced open position. In one or more embodiments, the method then determines that a user of the electronic device, e.g., a photographer, is taking a picture of another person or persons, i.e., the subject(s), using the front-facing camera.

In one or more embodiments, the method optionally determines that the subject is not looking at the front-facing camera, which would result in photo of poor quality. In one or more embodiments, this determination is made using face recognition technology operating on the one or more processors.

In one or more embodiments, the method then invokes the rear-facing camera to capture images or video of the photographer. One or more processors of the electronic device can optionally create an augmented reality (AR) based eye-catching image of the photographer by applying one or more filters. These filters can result in a funny looking image of the photographer that can be presented on the front facing display to the subject.

In one or more embodiments, the method optionally, and thereafter, determines that the subject is now looking at the front-facing camera. Thereafter, one or more processors of the electronic device can cause the front-facing camera to capture the photo in response to the determination that the subject is now looking at the front-facing camera.

In some embodiments, a hinged electronic device having multiple displays is provided. In such embodiments, a first display, sometimes referred to as the "interior" display or the "rear-facing" display, is concealed when a first device housing is pivoted about the hinge relative to a second device housing to a closed position. This first display is then revealed when the first device housing is pivoted about the hinge relative to the second device housing from the closed position to an axially displaced open position. A second display, sometimes referred to as an "exterior" display or "front-facing" display, is exposed both when the first device housing and the second device housing are pivoted about the hinge to the closed position or the axially displaced open position.

In other embodiments, the electronic device has a single device housing that is deformable. A first display is concealed when a first device housing portion is pivoted about the hinge relative to a second device housing portion to a closed position. This first display is then revealed when the first device housing portion is pivoted about a deformable portion of the device housing relative to the second device housing portion from the closed position to an axially displaced open position. A second display is exposed both when the first device housing portion and the second device housing portion are pivoted about the deformable portion to the closed position or the axially displaced open position Regardless of which mechanical configuration is used (where the hinge is included the first device housing serves as a first device housing portion with the second device housing serving as a second device housing portion), in one or more embodiments each of the first display and the second display is a high-resolution display. Embodiments of the disclosure contemplate that prior art devices that include any form of second display employ low-resolution displays for this purpose. Such a low-resolution display lacks richness and is generally ineffective for tasks like presenting images and other complex content. By contrast, embodiments of the disclosure provide electronic devices where both the first display and the second display are rich, high-resolution displays.

As used herein, a "high-resolution" display refers to displays suitable for the presentation of text, information, and graphics on a mobile device with sufficient granularity as to be easily switched between graphics or text. For example, the high-resolution display would be one suitable for presenting an image in the Joint Photographics Expert Group (JPG) format without distortion. Such displays generally are configured to turn on and off individual pixels by way of a display driver for the presentation of high-resolution information. Examples include organic light emitting diode (OLED) displays, liquid crystal displays (LCD), and plasma display panels (PDP). This is in contrast to low-resolution displays used by the prior art as exterior displays where the presentation of JPG images it is not possible without distortion.

In one or more embodiments, in addition to including the first display and the second display, the deformable electronic device includes at least two image capture devices or "imagers." In one or more embodiments, the electronic device includes at least a first imager and a second imager, with the second imager being an interior or rear-facing imager that is concealed when the first device housing or first device housing portion is pivoted about the hinge or deformable portion relative to the second device housing or second device housing portion to the closed position, but that is revealed when the first device housing or first device housing portion is pivoted about the hinge or deformable portion relative to the second device housing or second device housing portion from the closed position to an axially displaced open position. For simplicity in the discussion that follows, "first device housing" and "first device housing portion" will be used interchangeably and synonymously, as will "second device housing" and "second device housing portion" due to the fact that the only difference is what couples the two, be it a deformable portion of a single device housing or a hinge.

A person can capture images by activating the front-facing imager and directing its lens toward a subject that they wish to photograph. Thereafter, the person delivers user input causing the front-facing imager to capture an image of the subject. Alternatively, the person can use the rear-facing imager to take a self-image or "selfie." Since two imagers are included with embodiments of the disclosure, the person can capture images by activating the front-facing imager, directing its lens toward a subject or scene that they wish to capture, and delivering user input causing the imager to capture an image of the subject or scene. The inclusion of a second imager allows image content of the person to be captured and presented to the subject before, or while, their picture is being taken with the front-facing image capture device.

In still other embodiments, the electronic device can include three or more imagers. Thus, electronic devices configured in accordance with embodiments of the disclosure can include multiple imagers at different positions.

In one or more embodiments, both the front-facing imager and the front-facing display are exposed when the first device housing and the second device housing are in the closed position. In one or more embodiments, one or more processors of the electronic device detect the first device housing pivoting relative to the second device housing from the closed position to the axially displaced open position. In one or more embodiments, when this occurs, the one or more processors enable an image content presentation feature intended to capture the attention of a subject by presenting personalized image content depicting the face of a photographer.

In one or more embodiments, after detecting the first device housing pivoting relative to the second device housing from the closed position to the axially displaced open position, the one or more processors then detect an image capture operation occurring. While the image capture operations can be associated with rear-facing or other imagers, in one or more embodiments the one or more processors detect an image capture operation occurring with the front-facing or exterior imager, i.e., the imager that is exposed along with the exterior display when the first device housing and the second device housing are pivoted about the hinge to the closed position. Examples of image capture operations include actuation of the front-facing imager, receipt of user input directing the front-facing imager to capture one or more images or video, the actuation of facial recognition algorithms that employ the front-facing imager to analyze light received in its field of view to identify various characteristics of a subject or scene, or other operations.

In one or more embodiments, in response to detecting an image capture operation using the front-facing imager occurring after detecting the first device housing pivoting relative to the second device housing from the closed position to the axially displaced open position, the one or more processors cause viewfinder images captured by the rear-facing imager, one or more images captured by the rear-facing imager, or video captured by the rear-facing imager to be temporarily displayed on the exterior display. Since the exterior display is located on the same side of the electronic device as the front-facing camera in one or more embodiments, a subject looking at the front-facing camera is able to also see the image content presented on the exterior display.

Image content can take any of a number of forms. Examples include a viewfinder stream depicting the photographer, a static image depicting the photographer, or video of the photographer. In such situations, image(s), image streams, and/or video taken by the rear-facing camera is presented on the exterior or front-facing display so that the subject of the image can see a depiction of the photographer before or during their picture being taken. In one or more embodiments, this image content depicting the photographer can be temporarily displayed, such as a period of fifteen or fewer seconds.

In another embodiment, the image content depicting the photographer can comprise altered image content. Illustrating by example, an augmented reality filter can be applied to alter the appearance of the depiction of the photographer. The filter can transform the depiction of the photographer into a funny augmented image of the photographer or partial animation of the depiction of the photographer so as to catch the attention of subjects within the field of view of the front-facing camera so that their attention is turned to the electronic device.

In still another embodiment, the content can comprise instructional information. When the rear-facing imager captured video content or viewfinder streams of the photographer, this allows the photographer to use the front-facing display to personally instruct the subject of an image to adopt a particular pose, to say something, to make certain faces, and so forth.

In yet another embodiment, the image content can be augmented with a funny or humorous filter. In one or more embodiments, the filter overlays depictions of the photographer with humorous or amusing animations for presentation on the exterior display to make the subject of images smile.

In some embodiments, the presentation of the image content depicting the photographer occurs only as certain times. Facial detection can be used in such embodiments. Embodiments of the disclosure contemplate that the presentation of image content depicting the photographer may only be desirable when a person is failing to look generally toward the electronic device. Disabling the presentation of image content when the subject is looking directly at the electronic device can conserve battery power.

The amount of time that the image content depicting the photographer is displayed can vary. For image content depicting the photographer presented before the capture of an image of a subject, this image content depicting the photographer can be presented for a predetermined duration, such as a period of five or ten seconds. This amount of time allows a subject to see the image content depicting the photographer briefly before their picture is taken without feeling anxious since the image content depicting the photographer is only briefly presented.

For image content depicting the photographer that is shown during the capture of an image, the amount of time this image content depicting the photographer is presented can vary. For example, if the image content depicting the photographer comprises an animated filter, the motion of this animated filter may be synchronized such that it is moving while the image of the subject is captured. Moreover, presentation of the image content depicting the photographer can repeat in one or more embodiments.

In still another embodiment, cessation of the presentation of image content depicting the photographer can occur when there are no longer any faces detected within the field of view of the external imager. In other embodiments, the expiration of a timer may cause the cessation of the presentation of the image content depicting the photographer. Other examples of termination events causing cessation of the presentation of image content depicting the photographer will be obvious to those of ordinary skill in the art having the benefit of this disclosure.

In one or more embodiments, the presentation of image content depicting the photographer is supported in both portrait and landscape mode, just as is the image capture operation. Thus, when an electronic device is held in portrait mode, the image content depicting the photographer can be presented in portrait mode. By contrast, when the electronic device is rotated to landscape mode, the presentation of the image content depicting the photographer can rotate as well so that the subject always views the image content depicting the photographer right-side up.

In one or more embodiments, a user can be prompted regarding whether and/or how image content depicting the photographer is presented. For instance, in one or more embodiments, upon actuating an imager a menu is presented on the interior display allowing a user to select one or more filters to be applied to the image content depicting the photographer.

In other embodiments, automatic scene detection performed by the one or more processors of the electronic device can be used to select a filter to be applied to the image content depicting the photographer. If, for example, the subject of a photo is detected as being a child, a favorite cartoon character filter may be applied to the image content depicting the photographer, one example of which is a filter based upon the cartoon dog, Buster, playing with his friends Mac and Henry. By contrast, if the subject of the photo is detected as being a group of adults, the filter applied to the image content depicting the photographer may be adult themed, perhaps depicting the photographer as a bartender at the local pub, and so forth.

In one or more embodiments, the presentation of image content depicting the photographer can be enabled and disabled as a function of the physical state of the electronic device. If the first device housing and the second device housing are pivoted from the axially displaced open position to the closed position, in one or more embodiments the presentation of image content depicting the photographer is disabled. By contrast, if the first device housing and the second device housing are pivoted about the hinge from the closed position to the axially displaced open position, in one or more embodiments the presentation of image content depicting the photographer is enabled.

In one or more embodiments, light input can be used to enable and disable the presentation of image content depicting the photographer in addition to, or instead of, the physical state of the electronic device. If, for example, the electronic device is in a low light environment, in one or more embodiments the presentation of image content depicting the photographer is disabled. This prevents the presentation of image content depicting the photographer in environments such as movie theaters. By contrast, if the electronic device is in a high light environment, in one or more embodiments the presentation of image content depicting the photographer is enabled, and so forth. Other enablement and disablement techniques will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIG. 2, a partially open position, shown and described below with reference to FIG. 3, and an open position, shown and described below with reference to FIGS. 4-5.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge 101. However, in other embodiments two or more hinges can be incorporated into the electronic device 100 to allow it to be folded in multiple locations.

While the illustrative electronic device 100 of FIG. 1 includes a hinge 101, embodiments of the disclosure are not so limited. In other embodiments, such as those described below with reference to FIGS. 7-9, the electronic device 100 will be bendable, but will not include a hinge 101, such as when the first device housing 102 and the second device housing 103 are a first device housing portion and a second device housing portion linked by a deformable portion of a single device housing manufactured from bendable materials. In still other embodiments, the electronic device 100 can be bendable via a combination of hinge components and non-hinge components.

Illustrating by example, in another embodiment the electronic device 100 of FIG. 1 includes a single housing. In one or more embodiments, one example of which is shown below in FIGS. 7-9, that housing is flexible. In one embodiment, the housing may be manufactured from a malleable, bendable, or physically deformable material such as a flexible thermoplastic, flexible composite material, flexible fiber material, flexible metal, organic or inorganic textile or polymer material, or other materials. The housing could be formed from a single flexible housing member or from multiple flexible housing members.

In other embodiments, the housing could be a composite of multiple components. For instance, in another embodiment the housing could be a combination of rigid segments connected by hinges or flexible materials. Still other constructs will be obvious to those of ordinary skill in the art having the benefit of this disclosure.

The illustrative electronic device 100 of FIG. 1 includes multiple displays. A first display 105, also referred to as the interior display or the rear-facing display, is concealed when the first device housing 102 is pivoted about the hinge 101 relative to the second device housing 103 to a closed position. For example, the first display 105 is concealed in FIG. 2 below. This first display 105 is then revealed when the first device housing 102 is pivoted about the hinge 101 relative to the second device housing 103 from the closed position to an axially displaced open position. Thus, the first display 105 is revealed as the electronic device 100 transitions from the closed position of FIG. 2 to the open position of FIGS. 4-5.

In one or more embodiments, the electronic device 100 also includes at least a second display 120. In the illustrative embodiment of FIG. 1, the second display 120 can be referred to as an exterior display or front-facing display, as the second display 120 is exposed both when the first device housing 102 and the second device housing 103 are pivoted about the hinge 101 to the closed position or the axially displaced open position. Thus, the second display 120 is exposed both in the axially displaced open position of FIG. 1 and the closed position of FIG. 2. In one or more embodiments, each of the first display 105 and the second display 120 is a high-resolution display.

While shown coupled to the first device housing 102, it should be noted that the second display 120 could be coupled to either of the first device housing 102 or the second device housing 103. In other embodiments, the second display 120 can be coupled to the first device housing 102, while a third display (not shown) is coupled to the second device housing 103. Thus, electronic devices configured in accordance with embodiments of the disclosure can include displays situated at different positions.

As with the second display 120, the first display 105 can also be coupled to either or both of the first device housing 102 or the second device housing 103. In this illustrative embodiment, the first display 105 is coupled to both the first device housing 102 and the second device housing 103 and spans the hinge 101. In other embodiments, as will be described below with reference to FIG. 6, the "first" display can be two displays, with one coupled to the first device housing 102 and another coupled to the second device housing 103. In either case, this first display 105 is considered to be an "interior" display because it is concealed when the first device housing 102 and the second device housing 103 are in the closed position.

In one or more embodiments, either or both of first display 105 and second display 120 can be touch-sensitive. Where this is the case, users can deliver user input to one or both of the first display 105 or the second display 120 by delivering touch input from a finger, stylus, or other objects disposed proximately with the first display 105 or the second display 120.

In the illustrative embodiment of FIG. 1, since the first display 105 spans the hinge 101, it is configured to be flexible. For instance, in one embodiment the first display 105 is configured as an organic light emitting diode (OLED) display fabricated on a flexible plastic substrate. This allows the first display 105 to be flexible so as to deform when the first device housing 102 pivots about the hinge 101 relative to the second device housing 103. However, it should be noted that other types of displays would be obvious to those of ordinary skill in the art having the benefit of this disclosure. As will be described below with reference to FIG. 6, in other embodiments conventional, rigid displays can be disposed to either side of the hinge rather than using a flexible display.

In one or more embodiments, the first display 105 is configured as an OLED constructed on flexible plastic substrates to allow the first display 105 to bend in accordance with various bending radii. For example, some embodiments allow bending radii of between thirty and six hundred millimeters to provide a bendable display. Other substrates allow bending radii of around five millimeters to provide a display that is foldable through active bending. Other displays can be configured to accommodate both bends and folds. In one or more embodiments the first display 105 may be formed from multiple layers of flexible material such as flexible sheets of polymer or other materials.

In this illustrative embodiment, the first display 105 is coupled to the first device housing 102 and the second device housing 103. Accordingly, the first display 105 spans the hinge 101 in this embodiment. In one or more embodiments, the first display 105 can instead be coupled to one, or two, spring-loaded, slidable trays that situate within one or both of the first device housing 102 and the second device housing 103. The use of one or two slidable trays advantageously allows the first display 105 to be placed in tension when the electronic device 100 is in the open position. This causes the first display 105 to be flat, rather than wavy due to mechanical memory effects, when the electronic device 100 is in the open position.

Features can be incorporated into the first device housing 102 and/or the second device housing 103. Examples of such features include imager 106, which in this embodiment is an exterior or front-facing imager. The imager 106, which can be any number of types of image capture devices, has its lens situated such that it is directed away from a user who is holding the electronic device 100 and facing the second display 120. This allows the imager 106 to receive light directed toward the electronic device 100 from a location in front of the user when the user is holding the electronic device 100 and facing the first display 105.

In addition to the imager 106, a second, rear-facing imager 121 can be positioned on the interior side of the electronic device 100 to receive light and images directed toward the first display 105. When a user is holding the electronic device 100 and looking at the first display 105, this second, rear-facing imager 121 can be used to take a selfie without turning the electronic device 100 around. While two imagers are shown in the illustrative embodiment of FIG. 1, it should be noted that embodiments of the disclosure can include additional imagers mounted in different positions that can be actuated to capture images from different angles.

Other examples of features that can be incorporated into the first device housing 102 and/or the second device housing 103 include an optional speaker port 107. While shown situated on the exterior of the electronic device 100 in FIG. 1, the optional speaker port 107 could also be placed on the interior side as well. In this illustrative embodiment, a user interface component 114, which may be a button or touch sensitive surface, can also be disposed along the exterior side of the second device housing 103. As noted, any of these features shown being disposed on the exterior side of the electronic device 100 could be located elsewhere, such as on the interior side or minor sides in other embodiments.

A block diagram schematic of the electronic device 100 is also shown in FIG. 1. In one embodiment, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 113, can optionally store the executable software code used by the one or more processors 112 during operation.

The one or more processors 112 can optionally include, and be operable with, a timer 122. For example, when a user delivers a user command for the imager 106 or second imager 121 to capture an image, the one or more processors 112 can initiate and/or actuate the timer 122. The use of the timer 122 can be used in association with the presentation of image content depicting the photographer, as will be described in more detail below.

In one or more embodiments, the electronic device 100 also includes an image capture analysis/synthesis manager 111 that identifies actuation of the imager 106 and/or second imager 121 and/or image capture operations. For example, the image capture analysis/synthesis manager 111 can detect user actuation of the imager 106 and/or second imager 121. The image capture analysis/synthesis manager 111 can also include a facial recognition module that analyzes images captured by the imager 106 and/or second imager 121 to identify facial characteristics present in images captured by the imager 106 and/or second imager 121. In one or more embodiments, in response to the image capture analysis/synthesis manager 111 identifying these or other image capture operations, the one or more processors can cause the presentation of image content depicting a photographer to a subject as will be described in more detail below.

In this illustrative embodiment, the electronic device 100 also includes a communication circuit 128 that can be configured for wired or wireless communication with one or more other devices or networks. The networks can include a wide area network, a local area network, and/or personal area network. The communication circuit 128 may also utilize wireless technology for communication, such as, but are not limited to, peer-to-peer or ad hoc communications such as HomeRF, Bluetooth and IEEE 802.11, and other forms of wireless communication such as infrared technology. The communication circuit 128 can include wireless communication circuitry, one of a receiver, a transmitter, or transceiver, and one or more antennas 115.

In one embodiment, the one or more processors 112 can be responsible for performing the primary functions of the electronic device 100. For example, in one embodiment the one or more processors 112 comprise one or more circuits operable with one or more user interface devices, which can include the display 105, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the electronic device 100. The operating system environment can include a kernel and one or more drivers, and an application service layer, and an application layer. The operating system environment can be configured as executable code operating on one or more processors or control circuits of the electronic device 100.

The application layer can be responsible for executing application service modules. The application service modules may support one or more applications or "apps." Examples of applications shown in FIG. 1 include an Internet browser application 124, an electronic mail application 126, a social media application 123, and an image capture application 127. These applications are illustrative only, as numerous others will be obvious to those of ordinary skill in the art having the benefit of this disclosure. The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

Figure 2:
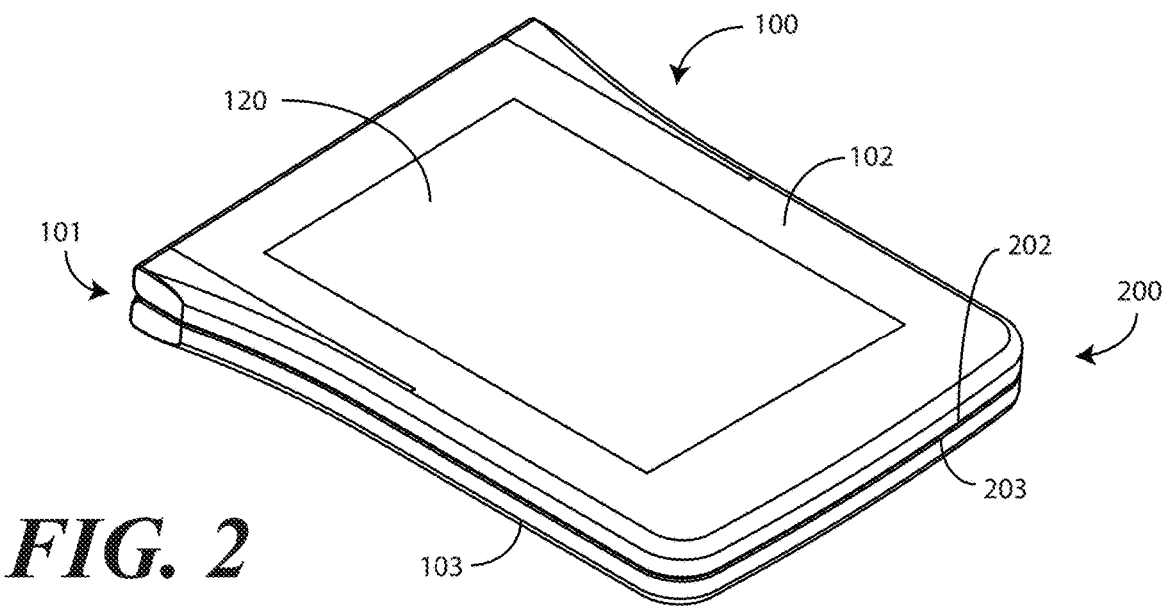
FIG. 2 illustrates one explanatory electronic device with a first device housing and a second device housing pivoted to a closed position in accordance with one or more embodiments of the disclosure.
Figure 3:
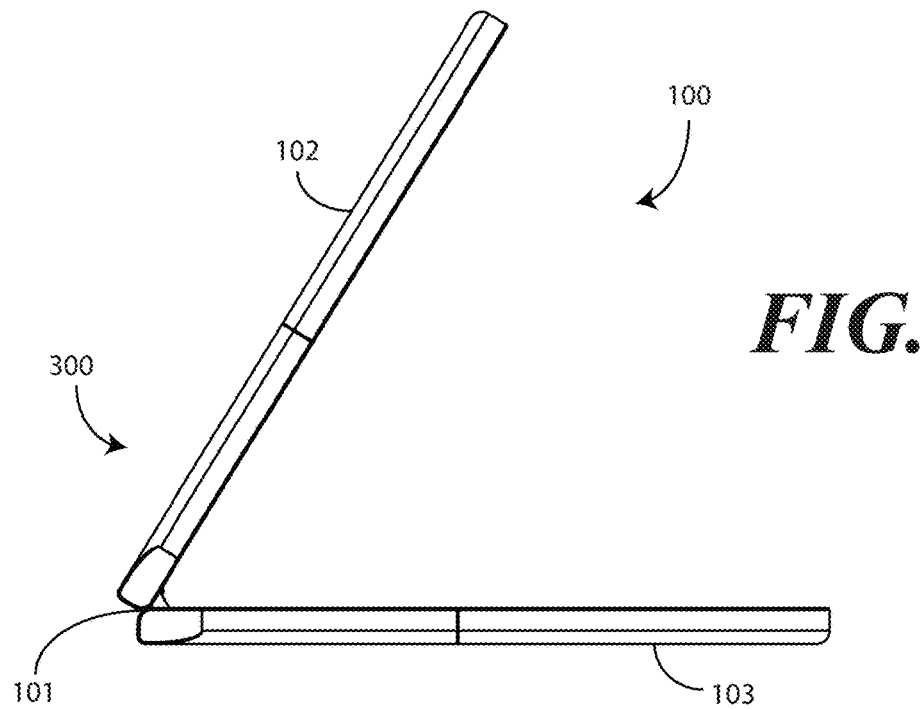
FIG. 3 illustrates one explanatory electronic device with a first device housing and a second device housing pivoted to a partially open position in accordance with one or more embodiments of the disclosure.

In one embodiment, the electronic device 100 includes one or more flex sensors 117, operable with the one or more processors 112, to detect a bending operation that causes the first device housing 102 to pivot about the hinge 101 relative to the second device housing 103, thereby transforming the electronic device 100 into a deformed geometry, such as that shown in FIGS. 2-3. The inclusion of flex sensors 117 is optional, and in some embodiment flex sensors 117 will not be included.

In one embodiment, the flex sensors 117 comprise passive resistive devices manufactured from a material with an impedance that changes when the material is bent, deformed, or flexed. By detecting changes in the impedance as a function of resistance, the one or more processors 112 can use the one or more flex sensors 117 to detect bending of the first device housing 102 about the hinge 101 relative to the second device housing 103. In one or more embodiments, each flex sensor 117 comprises a bi-directional flex sensor that can detect flexing or bending in two directions. In one embodiment, the one or more flex sensors 117 have an impedance that increases in an amount that is proportional with the amount it is deformed or bent.

In one embodiment, each flex sensor 117 is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paper-based materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor 117 bends, the impedance of the resistive layer changes, thereby altering the flow of current for a given voltage. The one or more processors 112 can detect this change to determine an amount of bending. Taps can be added along each flex sensor 117 to determine other information, including the amount of bending, the direction of bending, and so forth. The flex sensor 117 can further be driven by time-varying signals to increase the amount of information obtained from the flex sensor 117 as well. While a multi-layered device as a flex sensor 117 is one configuration suitable for detecting at least a bending operation occurring to deform the electronic device 100 and a geometry of the electronic device 100 after the bending operation, others can be used as well. Other types of flex sensors 117 will be obvious to those of ordinary skill in the art having the benefit of this disclosure.

In one embodiment, the one or more processors 112 may generate commands or execute control operations based on information received from the various sensors, including the one or more flex sensors 117, the user interface, which includes display 105 and display 120, or the other sensors 119. Illustrating by example, in one or more embodiments the one or more processors 112 enable the image capture analysis/synthesis manager 111 when the one or more flex sensors 117 indicate that the first device housing 102 has pivoted about the hinge 101 relative to the second device housing 103 from the closed position to the axially displaced open position.

The one or more processors 112 may also generate commands or execute control operations based upon information received from a combination of the one or more flex sensors 117, the user interface, or the other sensors 119. Alternatively, the one or more processors 112 can generate commands or execute control operations based upon information received from the one or more flex sensors 117 or the user interface alone. Moreover, the one or more processors 112 may process the received information alone or in combination with other data, such as the information stored in the memory 113.

The one or more other sensors 119 may include a microphone, an earpiece speaker, a second loudspeaker (disposed beneath speaker port 107), and a user interface component such as a button or touch-sensitive surface. The one or more other sensors 119 may also include key selection sensors, proximity sensors, a touch pad sensor, a touch screen sensor, a capacitive touch sensor, a light sensor, and one or more switches. Touch sensors may used to indicate whether any of the user actuation targets present on the display 105 are being actuated. Alternatively, touch sensors disposed in the electronic device 100 can be used to determine whether the electronic device 100 is being touched at side edges or major faces of the first device housing 102 or the second device housing 103. The touch sensors can include surface and/or housing capacitive sensors in one embodiment. The other sensors 119 can also include audio sensors and video sensors (such as a camera).

The other sensors 119 can also include motion detectors, such as one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion.

Other components 125 operable with the one or more processors 112 can include output components such as video outputs, audio outputs, and/or mechanical outputs. Examples of output components include audio outputs such as speaker port 107, earpiece speaker, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Turning now to FIG. 2, illustrated therein is the electronic device 100 in a closed state. In this state, the first device housing 102 has been pivoted about the hinge 101 toward the second device housing 103 to a closed position 201. When in the closed position 201, a front surface 202 of the first device housing 102 abuts a front surface 203 of the second device housing 103. When in the closed position 201, the exterior display, i.e., second display 120, is visible, exposed, and accessible by a user. By contrast, when in the closed position 201, the interior display, i.e., first display (105), is concealed, is not visible, and is inaccessible by a user. Effectively, in the closed position 201 the first device housing 102 and the second device housing 103 are analogous to clam shells that have been shut by the claim, thereby giving rise to the "clamshell" style of device.

Turning now to FIG. 3, the electronic device 100 is shown being transitioned from the closed position (201) of FIG. 2 to a partially opened position. Specifically, the first device housing 102 is pivoting about the hinge 101 away from the second device housing 103 toward, but not fully yet to, an open position where the first device housing 102 is axially displaced about the hinge 101 from the second device housing 103. The position shown in FIG. 3 can be referred to as a "tent position" 301.

Turning now to FIGS. 4 and 5, illustrated therein is the electronic device 100 in an open position 401 where the first device housing 102 is rotated about the hinge 101 so as to become axially displaced from the second device housing 103. In the open position, the first device housing 102 is rotated about the hinge 101 180-degrees out of phase with the second device housing 103 such that the first device housing 102 and the second device housing 103 effectively define a plane. The first display 105, being flexible, has been transitioned from a bent position into the elongated flat position show in FIG. 5. In one or more embodiments this occurs due to the action of one or more slidable trays (mentioned above), which can be disposed within one or both of the first device housing 102 and the second device housing 103.

Figure 6:
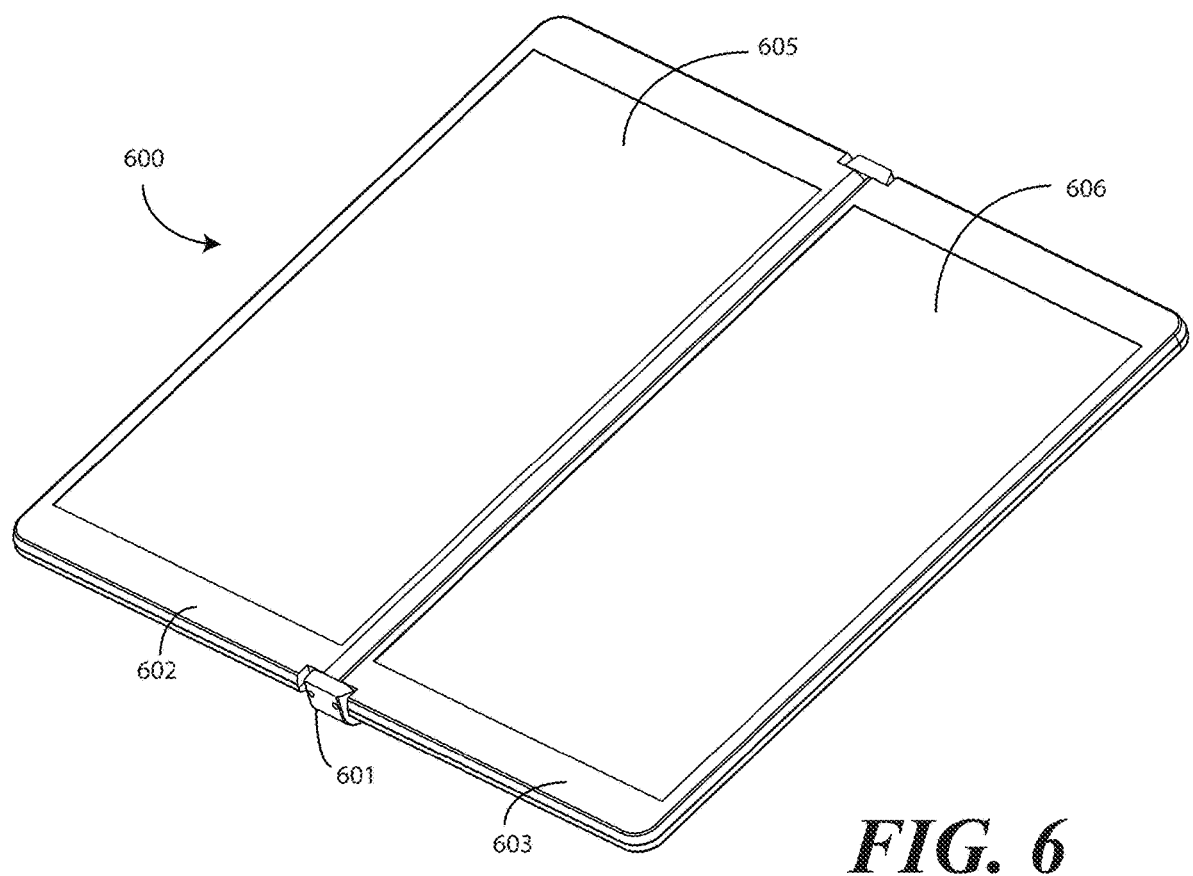
FIG. 6 illustrates another explanatory electronic device with a first device housing and a second device housing pivoted to an axially displaced open position in accordance with one or more embodiments of the disclosure.

Turning now to FIG. 6, illustrated therein is another electronic device 600 configured in accordance with one or more embodiments of the disclosure. The electronic device 600 of FIG. 6 is similar to the electronic device (100) of FIG. 1, in that it includes a first device housing 602 and a second device housing 603, and a hinge 601. The hinge 601 couples the first device housing 602 to the second device housing 603. The first device housing 602 is pivotable about the hinge 601 relative to the second device housing 603 between an axially displaced open position and a closed position, as previously described.

In one or more embodiments, the electronic device 600 also includes an exterior display attached to one of the first device housing 602 or the second device housing 603, as previously described above with reference to front-facing display (120) of FIG. 1. However, rather than having a flexible display, in this embodiment the electronic device 600 includes a first display 605 coupled to the first device housing 602 and a second display 606 coupled to the second device housing 603. Thus, in addition to separating the first device housing 602 from the second device housing 603, the hinge 601 separates the first display 605 from the second display 606 as well.

Turning now to FIGS. 7-10, illustrated therein is another explanatory electronic device 700 configured in accordance with one or more embodiments of the disclosure. While the physical configuration of the electronic device 700 of FIGS. 7-10 differs somewhat from the electronic device (100) of FIGS. 1-5 or the electronic device (600) in FIG. 6, in one or more embodiments the schematic diagram associated with the electronic device 700 includes some or all of the same components described above with reference to the block schematic diagram of FIG. 1. Accordingly, in one or more embodiments the electronic device 700 includes components such as one or more processors (112), one or more sensors (119) or flex sensors (117) operable to determine a geometry of the electronic device 700, and optionally an image capture analysis/synthesis manager (111), operating in substantially the same manner as previously described.

As with the electronic device (100) of FIGS. 1-5, the electronic device 700 of FIGS. 7-10 is a deformable electronic device, having both a device housing 701 and a display 710 that can be deformed by one or more bends, deformations, or folds. The electronic device 700 of FIGS. 7-10 is shown in an undeformed configuration in FIG. 7, and in a fully deformed configuration in FIGS. 8-10. More specifically, the geometry of the electronic device 700 defines a plane in FIG. 7, while a first device housing portion 702 is abutting a second device housing portion 703 in FIGS. 8-10.

As before, the electronic device 700 includes at least two imagers. In the illustrative embodiment of FIGS. 7-10, the electronic device 700 includes at least one imager 704 disposed to a first side 706 of a deformable portion 708 of the electronic device 700, and at least one other imager 705 disposed to a second side 707 of the deformable portion 708 of the electronic device 700. In this illustrative embodiment, both the at least one imager 704 and the at least one other imager 705 are situated beneath the display 710 of the electronic device 700.

Figure 8:
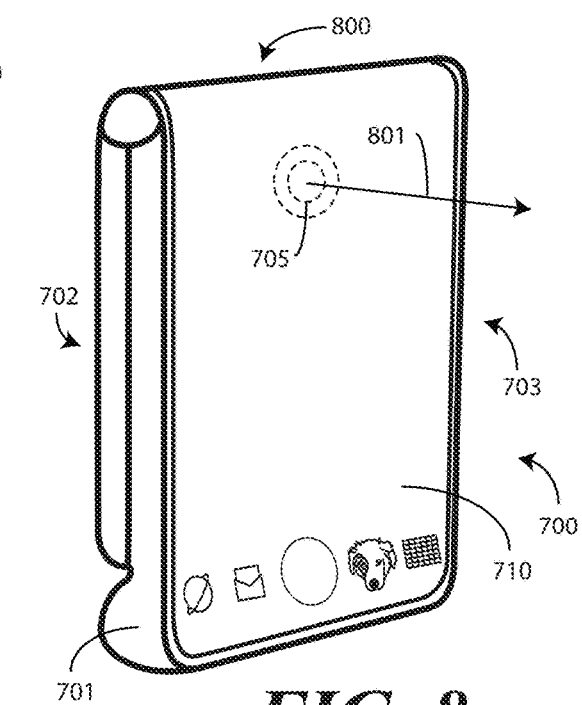
FIG. 8 illustrates a first perspective view of the explanatory deformable electronic device of FIG. 7 in a deformed state in accordance with one or more embodiments of the disclosure.
Figure 10:
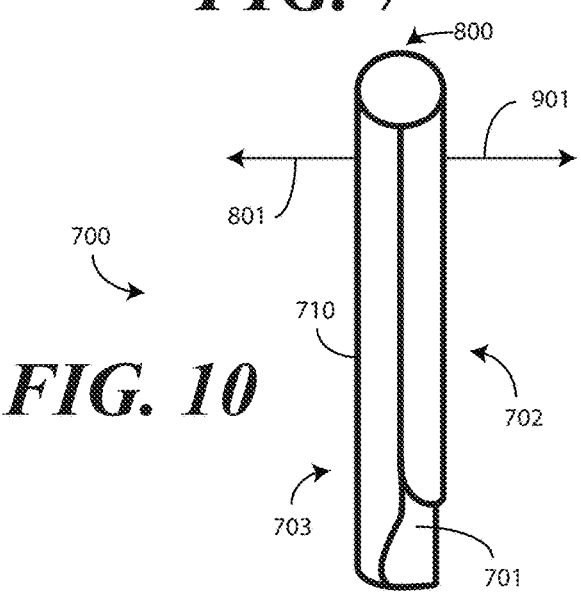
FIG. 10 illustrates a side elevation view of the explanatory deformable electronic device of FIG. 7 in the deformed state in accordance with one or more embodiments of the disclosure.
Figure 9:
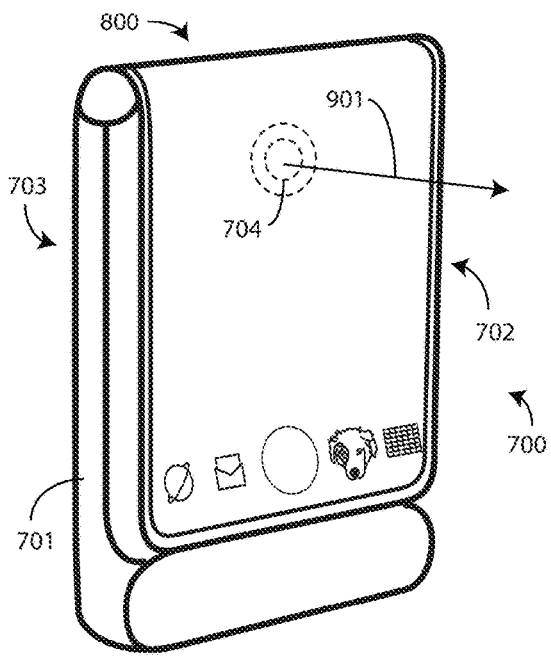
FIG. 9 illustrates a second perspective view of the explanatory deformable electronic device of FIG. 7 in a deformed state in accordance with one or more embodiments of the disclosure.

As shown in FIGS. 8-10, in one or more embodiments the geometry of the electronic device 700 defines a bend 800 with at least one imager 704 situated on the first device housing portion 702 and positioned on a first side of the bend 800 and the at least one other imager 705 situated on the second device housing portion 703 positioned to a second side of the bend 800. This results in a field of view 901 of the at least one imager 704 oriented in a direction that is substantially opposite (exactly opposite in this example) from another field of view 801 of the at least one other imager 705.

In one or more embodiments, each of the field of view 901 of the at least one imager 704 and the other field of view 801 of the at least one other imager 705 is a 180-degree field of view. This allows the at least one imager 704 and the at least one other imager 705 to capture 360-degree panoramic images when the electronic device 700 is deformed such that the first device housing portion 702 carrying the at least one imager 704 abuts the second device housing portion 703 carrying the at least one other imager 705 with the field of view 901 and the other field of view 801 oriented in substantially opposite directions. In other embodiments, one or both of the field of view 901 and the other field of view 801 can be less than 180-degrees. In some embodiments, the field of view 901 and the other field of view 801 can be adjusted by moving lenses situated between the sensors of the at least one imager 704 and the at least one other imager 705 and the display 710.

The electronic device 600 includes one or more sensors (119) and/or one or more flex sensors (117) operable to detect a geometry of the electronic device 700. Additionally, the electronic device 700 includes one or more processors (112).

The electronic device 700 of FIGS. 7-10 provides a dual image-capture device, with at least one imager 704 and at least one other imager 705 situated beneath a display 710. In one or more embodiments, the device housing 701 is bendable such that the display 710 bends in an outward facing configuration, with the display 710 visible even when the device housing 701 is fully bend such that the first device housing portion 702 and the second device housing portion 703 abut.

In one or more embodiments, the at least one imager 704 and the at least one other imager 705 are symmetrically situated relative to the deformation portion 708. Where the at least one imager 704 and the at least one other imager 705 are so situated, the fully folded configuration of FIGS. 8-10 causes the central axes of the field of view 901 and the other field of view 801 to be collinear. Said differently, this allows the field of view 901 and the other field of view 801 to situate on the opposite sides of the electronic device 700 centered along the same central axis.

In one or more embodiments, the one or more sensors (119) and/or one or more flex sensors (117) detect a geometry of the electronic device 700. In one or more embodiments, the one or more sensors (119) and/or the one or more flex sensors (117) detecting the geometry of the electronic device 700 make this geometry known to the one or more processors (112) and the image capture analysis/synthesis manager (111). In one or more embodiments, the one or more processors (112) perform operations described in the methods below as a function of the geometry of the electronic device 700.

Figure 11:
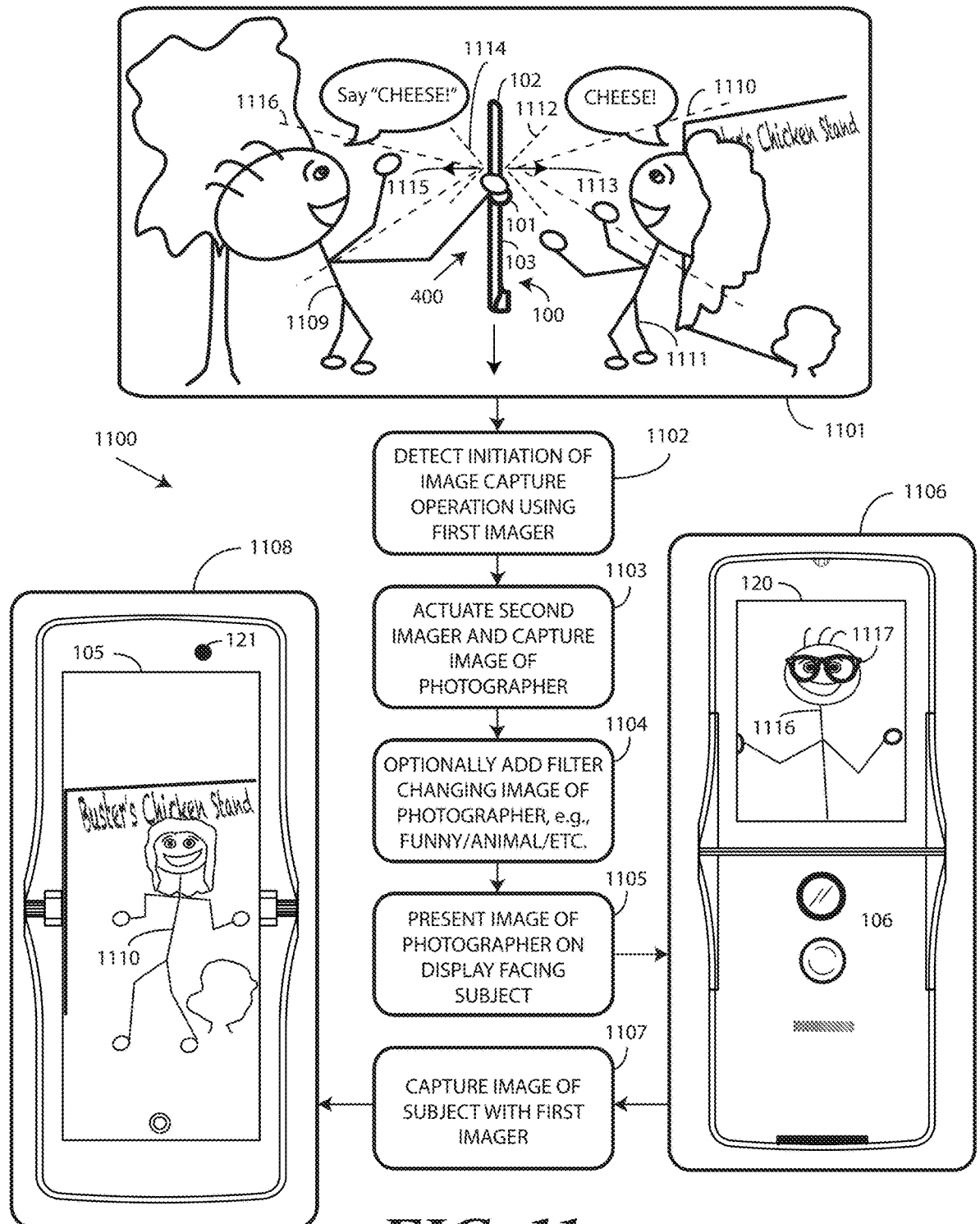
FIG. 11 illustrates one explanatory method in accordance with one or more embodiments of the disclosure.

Turning now to FIG. 11, illustrated therein is one explanatory method 1100 in accordance with one or more embodiments of the disclosure. Beginning at step 1101, a photographer 1109 is using the electronic device electronic device 100 of FIG. 1 to capture at least one image 1110 of a subject 1111. More specifically, the photographer 1109 is using the front-facing imager 106 of the electronic device 100 to capture the at least one image 1110 of the subject 1111. The at least one image 1110 could be a single static image, a series of burst images, a video stream, or other set of successively captured images.

As previously described, the electronic device 100 is a deformable electronic device in that the first device housing 102 can be pivoted relative to the second device housing 103 about a hinge 101 between a closed position (200) and an axially displaced open position 400. At step 1101, the photographer 1109 has pivoted the first device housing 102 relative to the second device housing 103 to the axially displaced open position 400. When this occurs, one or more sensors (119) and/or flex sensors (117) of the electronic device 100 detect the geometric form factor of the electronic device 100 exposing the rear-facing display 105 and rear-facing imager 121 (the front-facing imager 106 and front facing display 120) are exposed in both the axially displaced open position 400 and closed position (200)).

Additionally, the photographer 1109 has launched an image capture application (127) by delivering touch input to the rear-facing display 105. This actuates the front-facing imager 106 and allows the photographer 1109 to see image content depicting the subject 1111 in the form of imager viewfinder content on the rear-facing display 105 until the photographer 1109 delivers additional user input to the rear-facing display 105 initiating an image capture operation causing the at least one image 1110 of the subject 1111 to be captured and stored non-transitorily in the memory (113) of the electronic device 100. In one or more embodiments, the imager viewfinder content comprises a stream of images sensed by the sensor of the front-facing imager 106 and presented on one or more displays while the front-facing imager 106 is actuated, but that are not stored in the memory (113) other than in a transitory manner allowing presentation on those display(s).

Image capture operations can include operations such as actuating an imager, launching an imager application (127), directing the lens of an imager toward a subject 1111 that they wish to photograph, and delivering user input causing an imager to one or more of actuate, capture light, focus on an object or scene, emit light from a flash, and/or capture one or more images. Other examples of image capture operations include the actuation of facial recognition algorithms that employ an imager to analyze light received in its field of view to identify various characteristics of a subject or scene. Still other examples of image capture operations will be obvious to those of ordinary skill in the art having the benefit of this disclosure.

The image capture operations detected at step 1105 can be associated with the front-facing imager 106 or the rear-facing imager 121. However, embodiments of the disclosure contemplate that the presentation of image content depicting the photographer 1109 is particularly useful for a subject 1111, rather than the photographer 1109, in cases other than selfies. Accordingly, in one or more embodiments step 1105 comprises the one or more processors (112) detecting an image capture operation occurring with the front-facing or exterior imager, i.e., the front-facing imager 106 that is exposed along with the front facing display 120 when the first device housing 102 and the second device housing 103 are pivoted about the hinge 101 to the closed position 201 of step 1101. In such an embodiment, examples of image capture operations detected at step 1105 can include, among others, actuation of the front-facing imager, receipt of user input directing the front-facing imager to capture one or more images or video, capturing an image or video with an imager, the actuation of facial recognition algorithms that employ the front-facing imager to analyze light received in its field of view to identify various characteristics of a subject or scene, or other operations.

The one or more processors (112) of the electronic device 100 detect, at step 1102, the initiation of the image capture operation using an image capture device situated on a first surface of the electronic device 100, which in this example is the front-facing imager 106. This image capture device has a field of view 1112 extending away from the first surface in a first direction 1113.

At step 1103, in response to detecting the initiation of the image capture operation at step 1102, the one or more processors (112) actuate a second image capture device situated on a second surface of the electronic device 100, which in this example is the rear-facing imager 121. The rear facing imager 121 has a field of view 1114 extending away from the second surface in a second direction 1115. In this illustrative example, since the front and rear surfaces of the device housings are substantially parallel when the electronic device 100 is in the axially displaced open position 400, the first direction 1113 and the second direction 1115 are substantially opposite directions.

At step 1103, after actuating the second image capture device, the one or more processors (112) cause the second image capture device to capture image content 1116. As with the at least one image 1110 of the subject 1111, the image content 1116 can comprise any of a single static image, a series of burst images, imager viewfinder content, a video stream, or other set of successively captured images. In this example, the image content 1116 comprises video content with each frame including depictions of the photographer 1109.

At step 1104, the one or more processors optionally apply a filter 1117 to the image content 1116. In one or more embodiments, the filter 1117 alters the depiction of the photographer 1109 appearing in the image content 1116.

In one or more embodiments, the filter 1117 does this by applying or superimposing an augmented reality image or graphic atop the image content 1116 depicting the photographer 1109 while still leaving at least some of the depiction of the photographer 1111 remaining visible in the image content 1116. This allows for an alteration of the depictions of the photographer while still leaving the altered image content personalized by including depictions of the photographer's physical characteristics.

At step 1105, the one or more processors (112) present the image content 1116 on the display situated on the first surface of the electronic device 100, which in this example is the front facing display 120 that is visible by the subject 1111. In this illustrative example, the filter 1117 comprises a whacky pair of eyeglasses that have been applied to depictions of the photographer's face. However, the filter 1117 can take any of a number of other forms as well.

Generally speaking, the filter 1117 is anything applied to the image content 1116 that alters depictions of the photographer 1109. In one or more embodiments, this filter 1117 is funny, interesting, or humorous, and is intended to capture the attention of the subject 1111. In one or more embodiments, the filter 1117 is an augmented reality facial filter that the one or more processors (112) apply to the image content 1116 in real time.

Once the filter 1117 is applied, the resulting altered image can be placed on the front-facing display 120 that is visible to the subject 1111 to evoke a smile or laugh by the subject, as shown at step 1106. Advantageously, the image content 1116 presented on the front-facing display 120 is personalized in the fact that it depicts the actual face of the photographer 1109 regardless of whether a filter 1117 is applied thereto.

Through the application of the filter 1117, the one or more processors (112) of the electronic device 100 can optionally create an augmented reality based eye-catching image of the photographer 1109. These filters 1117 can result in a funny looking image of the photographer 1109 that can be presented on the front facing display 120 to the subject 1111.

In some embodiments, the filter 1117 alters the at least one depiction of the photographer 1109 by making at least one depiction of the photographer have visible characteristics associated with an animal. Illustrating by example, turning briefly to FIG. 14, in some embodiments a filter 1417 can make depictions of the photographer 1109 have visible characteristics associated with a cat. The filter 1417 of FIG. 14 comprises an augmented reality set of ears, nose and whiskers of a cat that are superimposed upon the depictions of the photographer 1109 in the image content 1116.

Figure 15:
FIG. 15 illustrates additional explanatory image content with another explanatory filter applied thereto in accordance with one or more embodiments of the disclosure.

By contrast, turning now to FIG. 15, in this example the filter 1517 makes depictions of the photographer 1109 have visible characteristics associated with a dog. The filter 1517 of FIG. 15 comprises an augmented reality dog face that is superimposed upon the depictions of the photographer 1109 in the image content 1116. The examples described above of eyeglasses filters, cat filters, and dog filters are illustrative examples only. Numerous other types of filters will be obvious to those of ordinary skill in the art having the benefit of this disclosure.

Illustrating by example, filters configured in accordance with embodiments of the disclosure can be animated. The cat features shown in FIG. 14 can include animated hands depicting a video of cat paws playing the piano. The dog features of FIG. 15 may include other superimposed augmented reality items, such as a car situated about the dog features to make the dog look like it is driving a car. The animal features shown in FIGS. 14-15 could be replaced by, for example, animated clown features that make the clown features appear to be laughing. The filters can make the otherwise serious photographer 1109 appear to be a cartoon character engaged in one or more silly activities. Such filters can be especially engaging with children who may be too young to understand that they are being photographed and who have no interest in looking toward an image capture device.

Figure 14:
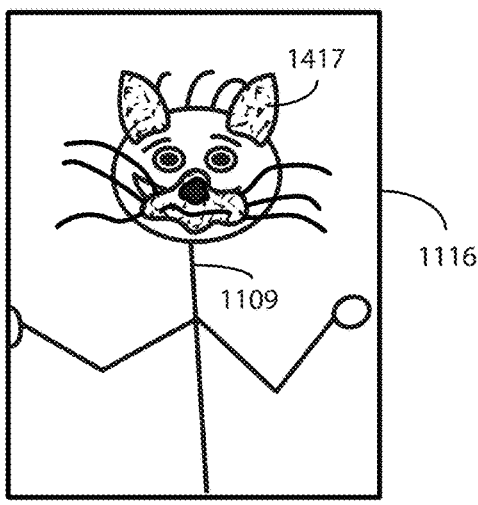
FIG. 14 illustrates explanatory image content with one explanatory filter applied thereto in accordance with one or more embodiments of the disclosure.

Alternatively, for older subjects, the filters may include textual indicia, such as the word "SMILE" placed above or below the cat features of FIG. 14 or the dog features of FIG. 15. Of course, the filters can include combinations of text and images, be they actual still or moving images or animated still or moving images. Still other examples of filters will be obvious to those of ordinary skill in the art having the benefit of this disclosure.

In one or more embodiments, regardless of what type of filter is used, at least some portion of the face of the photographer remains visible in the image content. In FIG. 14, portions of the face are visible behind the cat ears, nose, and whiskers. In FIG. 15, the photographer's hair is visible between the dog ears, and so forth.

Turning now back to FIG. 11, in one or more embodiments the image content 1116 of the photographer 1109 captured at step 1103 can be presented on the front facing display 120 at step 1105 temporarily and for only a predefined amount of time. Examples of the predefined amount of time include two seconds, three seconds, five seconds, ten seconds, or fifteen seconds. In one or more embodiments, the predefined amount of time is a period of fifteen or fewer seconds. Other predefined periods of time for the presentation of the image content 1116 of the photographer 1109 captured at step 1103 and presented on the front facing display 120 at step 1105 will be obvious to those of ordinary skill in the art having the benefit of this disclosure.

In one or more embodiments, the one or more processors (112) of the electronic device 100 may initiate a timer (122) at step 1105 to run for a predefined amount of time such as two seconds, three seconds, five seconds, ten seconds, or fifteen seconds. In one or more embodiments, the one or more processors (112) cause the image content 1116 of the photographer 1109 captured at step 1103 and presented on the front facing display 120 at step 1105 to be presented until the timer (122) expires. In one or more embodiments, the predefined amount of time is a period of fifteen or fewer seconds. This provides the subject 1111 sufficient time to notice the image content 1116 depicting the photographer 1109 and to respond accordingly without being rushed.

In one or more embodiments, after the image content 1116 of the photographer 1109 has been captured at step 1103 and presented on the front facing display 120 at step 1105, in one or more embodiments the one or more processors (112) capture the at least one image 1110 of the subject 1111 using the front-facing imager 106 at step 1107 in response to the initiation of the image capture operation detected at step 1102. In one or more embodiments, the at least one image 1110 of the subject 1111 is captured while the image content 1116 depicting the photographer 1109 is being presented on the front facing display 120. The captured at least one image 1110 can then be presented to the photographer 1109 on the rear facing display 105 for review, as shown at step 1108.

Accordingly, the method 1100 of FIG. 11 includes detecting, with one or more sensors (119), a geometric form factor of an electronic device 100 carrying multiple camera systems and multiple displays situated on the opposite sides of the device housings 102,103 being transitioned to an axially displaced open position 400. In one or more embodiments, the method 1100 then determines that a user of the electronic device 100, here the photographer 1109, is taking a picture of another person or persons, which includes the subject 1111 in this example.

In one or more embodiments, the actuation of the rear-facing imager 121, the capture of the image content 1116 of the photographer 1109, and the presentation of the same on the front facing display 120 only happens at certain times and is contingent upon one or more conditions precedent. Illustrating by example, when there is no living subject of an image to be captured, there is no need to actuate the rear-facing imager 121, capture the image content 1116 of the photographer 1109, or present of the same on the front facing display 120. If, for instance, the photographer 1109 is taking a picture of a landscape using the front-facing imager 106, the mountains, trees, grass, and hills of the landscape do not care if depictions of the photographer 1109 are presented on the front facing display 120.

Accordingly, in one or more embodiments steps 1103-1106 only occur when a living subject is within the field of view 1112 of the front-facing imager 106. Said differently, in one or more embodiments the one or more processors (112) of the electronic device 100 determine that a person is within the field of view 1112 of the front-facing imager 106 before performing steps 1103-1106. Thus, the capture of the image content 1116 of the photographer 1109 and the presentation of the same on the front facing display 120 occurs only when a person is within the field of view 1112 of the front-facing imager 106 in one or more embodiments.

Likewise, the one or more processors (112) can also check to see whether a person is in the field of view 1114 of the rear-facing imager 121 before performing steps 1103-1106 as well. If, for example, the photographer 1109 had placed the electronic device 100 on a tripod and walked away, there may not be a need to perform steps 1103-1106. Accordingly, in one or more embodiments the one or more processors (112) of the electronic device 100 determine that a person is within the field of view 1114 of the rear-facing imager 121 before performing steps 1103-1106. Thus, the capture of the image content 1116 of the photographer 1109 and the presentation of the same on the front facing display 120 occurs only when a person is within the field of view 1114 of the front-facing imager 106 in one or more embodiments.

Of course, a combination of these two conditions can be required as well. In one or more embodiments, the capture of the image content 1116 of the photographer 1109 and the presentation of the same on the front facing display 120 occurs only when a person is within the field of view 1112 of the front-facing imager 106 and another person is within the field of view 1114 of the rear-facing imager 121 in one or more embodiments.

Embodiments of the disclosure contemplate that it may be desirable to allow the presentation of the image content 1116 of the photographer 1109 on the front facing display 120 only when an authorized user of the electronic device 100 is using the electronic device 100. Accordingly, in one or more embodiments the one or more processors (112) attempt to authenticate the photographer 1109 as an authorized user of the electronic device 100 after capturing the photographer's image at step 1104. This can occur using facial recognition techniques, for example. Other techniques for authenticating a person as an authorized user of the electronic device 100 will be obvious to those of ordinary skill in the art having the benefit of this disclosure. In one or more embodiments, the presentation of the image content 1116 on the front facing display 120 occurs only when the person situated within the field of view 1114 of the rear-facing imager 121 is an authorized user of the electronic device 100.

Embodiments of the disclosure also contemplate that a principal advantage offered by embodiments of the disclosure is that the image content 1116 depicting the photographer 1109, especially when enhanced by the filter 1117, can serve as an "attention getter" when the subject 1111 is not looking at the electronic device 100. Accordingly, in one or more embodiments the method 1100 optionally determines that the subject 1111 is not looking at the front-facing imager 106, which would result in photo of poor quality. In one or more embodiments, this determination is made using face recognition technology operating on the one or more processors.

In one or more embodiments, the method 1100 then invokes the rear-facing imager 121 to capture images or video of the photographer 1109. Said differently, in one or more embodiments the one or more processors (112) determine that the subject 1111 is looking in a direction other than at the front-facing imager 106, with steps 1103-116 occurring only when the subject 1109 is looking in the direction other than at the front-facing imager 106.

As noted above, in one or more embodiments the image content 1116 of the photographer 1109 captured at step 1103 can be presented on the front facing display 120 at step 1105 temporarily and for only a predefined amount of time. While a timer can be used as previously described, when the image content 1116 depicting the photographer 1109 is working as an "attention getter," and is being displayed when the subject 1111 is not looking at the electronic device 100, it may not be necessary to continue displaying the same when capturing the attention of the subject 1111 is no longer required. Accordingly, in one or more embodiments the one or more processors (112) determine, using the front-facing imager 106, when the subject 1111 begins looking at the front-facing imager 106. In one or more embodiments, the at least one image 1110 of the subject 1111 is captured at step 1107 in response to detecting that the subject 1111 is now looking at the front-facing imager 106. Optionally, the one or more processors (112) can cease the presentation of the image content 1116 depicting the photographer 1109 once the subject 1111 begins looking at the front-facing imager 106 as well. If, for example, the photographer 1109 is trying to get a serious shot of the subject 1111, it may not be beneficial to have the image content 1116 depicting the photographer 1109 with a filter 1117 applied to the depictions of the photographer 1109 that include googly eyes. Accordingly, in one or more embodiments the same can optionally be removed once the subject 1111 begins looking at the front-facing imager 106.

In summary, in one or more embodiments, in response to detecting the image capture operation using the front-facing imager 106 at step 1102, which in this embodiment occurs after detecting, at step 1101, the first device housing 102 pivoting relative to the second device housing 103 from the closed position (200) to the axially displaced open position 400, step 1105 comprises the one or more processors (112) only temporarily displaying the image content 1116 depicting the photographer 1109 on the exterior display, i.e., display 120 in this illustrative embodiment. Illustrating by example, the one or more processors (112) may cease temporarily displaying the image content 1116 depicting the photographer 1109 on the front facing display 120 when the subject 1111 starts looking at the front-facing imager 106.

This "presentation of images of the photographer before or during the capture if images of the subject" method 1100 of FIG. 11 offers numerous advantages over prior art systems. Illustrating by example, if the photographer 1109 is the parent of a crying child serving as the subject 1111, and the parent knows just the right face to make to cause the child to laugh, the child will be able to see this face on the front-facing display 120 despite the fact that the electronic device 100 is positioned between parent and child as shown at step 1101. Where the image content 1116 of the photographer 1109 is video content, the parent can even use embodiments of the disclosure to communicate with and provide guidance to the child as well. Examples of such guidance could be to "stop crying," "look this way," "straighten up and fly right," and so forth.

Figure 12:
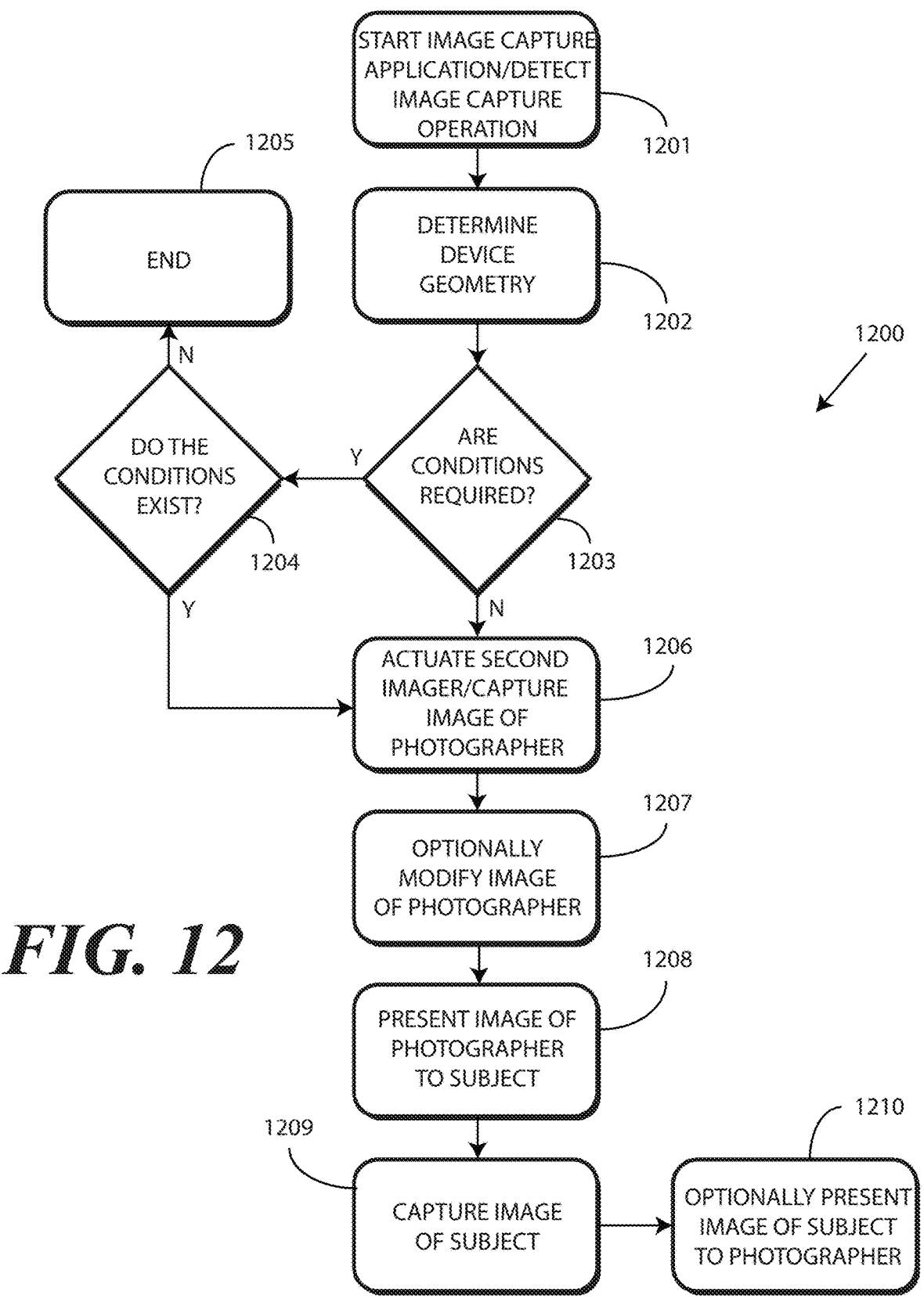
FIG. 12 illustrates yet another explanatory method in accordance with one or more embodiments of the disclosure.

Turning now to FIG. 12, illustrated therein is another method 1200 in accordance with one or more for embodiments of the disclosure. In one or more embodiments, a method 1200 includes detecting, with one or more sensors, a geometric form factor of an electronic device carrying multiple camera systems and multiple displays situated on the opposite sides of the device housing being transitioned to an axially displaced open position. In one or more embodiments, the method 1200 then determines that a user of the electronic device, e.g., a photographer, is taking a picture of another person or persons, i.e., the subject(s), using the front-facing camera.

In one or more embodiments, the method 1200 optionally determines that the subject is not looking at the front-facing camera, which would result in photo of poor quality. In one or more embodiments, this determination is made using face recognition technology operating on the one or more processors.

In one or more embodiments, the method 1200 then invokes the rear-facing camera to capture images or video of the photographer. One or more processors of the electronic device can optionally create an augmented reality based eye-catching image of the photographer by applying one or more filters. These filters can result in a funny looking image of the photographer that can be presented on the front facing display to the subject.

In one or more embodiments, the method 1200 optionally, and thereafter, determines that the subject is now looking at the front-facing camera. Thereafter, one or more processors of the electronic device can cause the front-facing camera to capture the photo in response to the determination that the subject is now looking at the front-facing camera.

Beginning at step 1201, one or more processors of an electronic device detect the initiation of an image capture operation using in image capture device situated on a first surface of the electronic device and having a field of view extending away from the first surface in a first direction. In one or more embodiments the one or more processors detect the image capture operation occurring with the front-facing or exterior imager at step 1201, i.e., the imager that is exposed along with the exterior display when the electronic device is in a closed position. Examples of image capture operations that can be detected at step 1201 include actuation of the front-facing imager, receipt of user input directing the front-facing imager to capture one or more images or video, the actuation of facial recognition algorithms that employ the front-facing imager to analyze light received in its field of view to identify various characteristics of a subject or scene, or other operations.

At step 1202, the method 1200 detects, using one or more sensors of the electronic device, a geometric form factor of the electronic device exposing a first image capture device having a field of view extending in a first direction. At step 1202, the method 1200 also detects that a second image capture device of the electronic device has a second field of view extending in a second direction that is substantially opposite to the first direction.

Illustrating by example, in one or more embodiments the electronic device includes a first device housing that is pivotable relative to a second device housing about a hinge between a closed position and an axially displaced open position. Such an electronic device (100) was described above with reference to FIGS. 1-5. When such a device is used, step 1202 can comprise detecting the first device housing pivoting relative to the second device housing about the hinge from the closed position or a partially closed position to the axially displaced open position, thereby revealing a rear-facing image capture device and rear-facing display. When the electronic device is in the axially displaced open position, this results in the field of view of the rear-facing image capture device having a field of view that extends in substantially the opposite direction from a field of view extending from the front-facing image capture device, which is exposed regardless of whether the electronic device is in the closed position or the axially displaced open position. In one or more embodiments, step 1202 comprises detecting that the electronic device has been transitioned to the axially displaced open position.

In another embodiment, described above with reference to FIGS. 7-8, the electronic device (700) includes a first housing portion that is pivotable relative to a second housing portion between an axially displaced open position where a first image capture device and a second image capture device each have a field of view that is oriented in the same direction, and a deformed state where the first housing portion and the second housing portion abut, with the fields of view of the first image capture device and the second image capture device being oriented in substantially opposite directions. Accordingly, in one or more embodiments step 1202 can comprise detecting the electronic device being transitioned to the deformed condition where the fields of view extend in substantially opposite directions.

Figure 7:
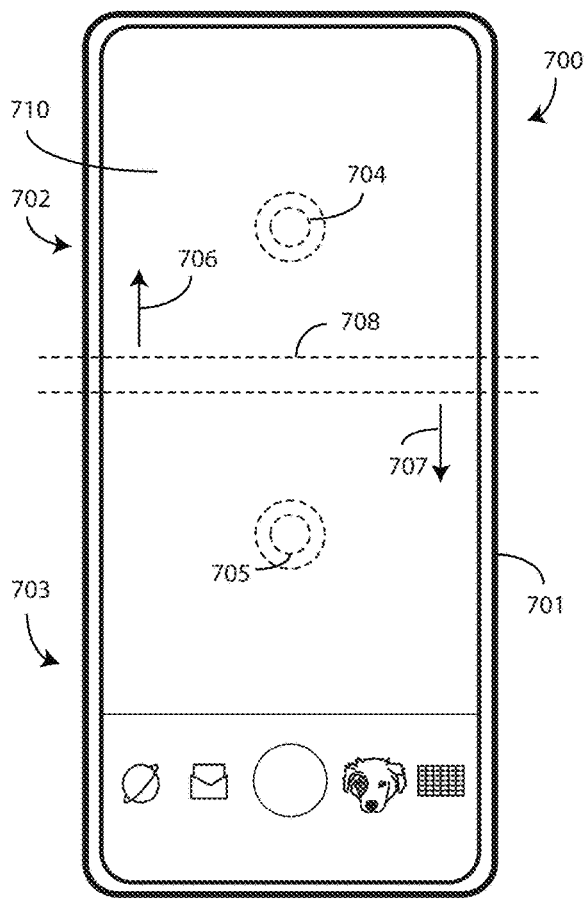
FIG. 7 illustrates yet another explanatory deformable electronic device in accordance with one or more embodiments of the disclosure with the deformable electronic device in an undeformed state.

When the electronic device (700) of FIG. 7 is deformed by bending in a direction opposite of that illustrated in FIGS. 8-10 to a closed position, step 1202 can comprise determining that the first housing portion pivots relative to the second housing portion from the closed position concealing both the first image capture device and the second image capture device to another deformed position where the fields of view extend in substantially opposite directions, and so forth.

Momentarily ignoring decisions 1203 and 1204 due to the fact that they are optional, at step 1206 the method 1200 captures image content using the first image capture device. In one or more embodiments, the first image capture device is an image capture device that was exposed at step 1202. In one or more embodiments, the image content captured at step 1206 comprises viewfinder content seen by the first image capture device.

At step 1208, the method 1200 presents at least some of the image content on a display that is visible within the second field of view of the second image capture device. Where the image content is viewfinder content captured by the first image capture device, step 1208 can comprise presenting at least some of the viewfinder content captured by the first image capture device on a second display that is visible by a subject when the subject is positioned within the field of view of the second image capture device.

At step 1209, the method 1200 captures, using the second image capture device, at least one image. In one or more embodiments step 1209 occurs while the at least some viewfinder content is being presented on the second display. In one or more embodiments, step 1208 occurs before step 1209. Step 1210 can then comprise presenting the image captured at step 1209 on a first display that is visible within the first field of view of the first image capture device for review.

Decision 1203 determines whether one or more conditions are required for steps 1206-1208 to occur. Decision 1204 determines, if conditions are required, whether they exist. As with the method (1100) of FIG. 11, in one or more embodiments the actuation of the first image capture device at step 1206, the capture of the image content at step 1206, and the presentation of the same on the second display only happens at certain times and is contingent upon one or more conditions precedent. Optional decision 1203 determines whether such conditions are required, with optional decision 1204 determining whether any required conditions are met in such instances. If they are, steps 1206-1208 occur. If not, the method 1200 ends at step 1205.

Figure 13:
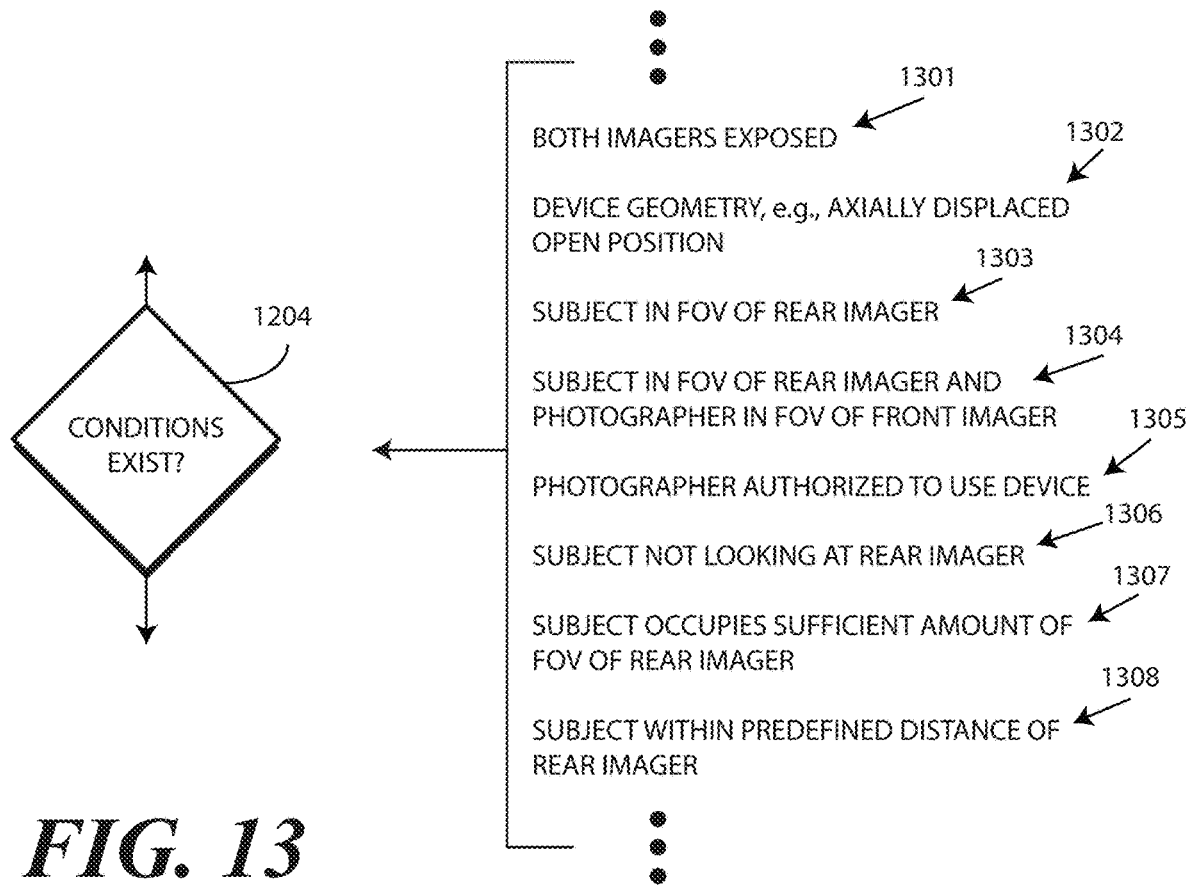
FIG. 13 illustrates explanatory conditions that may apply to one or more methods in accordance with one or more embodiments of the disclosure.

Turning briefly to FIG. 13, illustrated therein are some explanatory conditions that may be required for steps (1206-1208) of FIG. 12 to occur. These are illustrative only, as others will be obvious to those of ordinary skill in the art having the benefit of this disclosure.

A first condition that may be required for steps (1206-1208) of FIG. 12 to occur is that both a first image capture device and a second image capture device are exposed 1301. Illustrating by example, with the electronic device (100) of FIGS. 1-5, the rear-facing imager (121) is concealed when the electronic device (100) is in the closed position (200) but is exposed when the electronic device (100) is in the partially open position (300) or the axially displaced open position (400). Accordingly, in one or more embodiments decision 1204 requires at least a first image capture device and a second image capture device to be exposed 1301 for steps (1206-1208) of FIG. 12 to occur.

A second condition that may be required for steps (1206-1208) of FIG. 12 to occur is that the electronic device is in a particular geometry 1302. Illustrating by example, with the electronic device (100) of FIGS. 1-5, the rear-facing imager (121) is concealed when the electronic device (100) is in the closed position (200) but is exposed when the electronic device (100) is in the partially open position (300) or the axially displaced open position (400). Accordingly, in one or more embodiments decision 1204 requires the electronic device (100) to be in a particular geometry 1302 defined by the axially displaced open position for steps (1206-1208) of FIG. 12 to occur.

By contrast, using the electronic device (700) of FIGS. 7-10, a first image capture device and a second image capture device are oriented in a common direction when the electronic device (700) is in the axially displaced open position. By contrast, the fields of view of these image capture devices extend in substantially opposite directions when the electronic device (700) is in a deformed position with the first device housing portion and second device housing portion abutting while the display is exposed. Accordingly, in one or more embodiments decision 1204 requires the electronic device (100) to be in a particular geometry 1302 defined by this deformed position with the fields of view extending in substantially opposite directions for steps (1206-1208) of FIG. 12 to occur, and so forth.

A third condition that may be required for steps (1206-1208) of FIG. 12 to occur is that a subject may need to be within a field of view 1303 of a front-facing imager. Illustrating by example, when there is no living subject of an image to be captured, there is no need to perform steps (1206-1208). This is true because landscape, car, boat, house, tree, or building does not care if depictions of the photographer are presented on the front facing display. Accordingly, in one or more embodiments decision 1204 requires a living subject to be within the field of view 1303 of the front-facing imager for steps (1206-1208) of FIG. 12 to occur.

A fourth condition that may be required for steps (1206-1208) of FIG. 12 to occur is that both a subject and a photographer may need to be within a fields of view 1304 of a front-facing imager and rear-facing imager, respectively. Illustrating by example, when there is no photographer within the field of view of the rear-facing imager, there may be no need to perform steps (1206-1208) because viewfinder content, images, video, and so forth of the photographer cannot be captured. Accordingly, in one or more embodiments decision 1204 requires both a subject and a photographer may need to be within a fields of view 1304 of a front-facing imager and rear-facing imager, respectively, for steps (1206-1208) of FIG. 12 to occur.

A fifth condition that may be required for steps (1206-1208) of FIG. 12 to occur is that both the photographer may need to be an authorized user 1305 of the electronic device. In one or more embodiments decision 1204 determines whether a second person in a second field of view of a second image capture device is an authorized user 1305 of the electronic device. If so, steps (1206-1208) of FIG. 12 occur. Otherwise, they do not in one or more embodiments.

A sixth condition that may be required for steps (1206-1208) of FIG. 12 to occur is that the subject may need to be looking 1306 in a direction other than at the front-facing imager. An advantage offered by the method (1200) of FIG. 12 is that steps (1206-1208) can be used to call the attention of a subject. Thus, the fact that the subject is not looking at an image capture device being used to capture their image can be used as a trigger to perform steps (1206-1208). Accordingly, decision 1204 ensures steps (1206-1208) of FIG. 12 occur only when the first person is looking in the direction other than at the first image capture device being used to capture their image.

Embodiments of the disclosure contemplate that it can be challenging for one or more processors of an electronic device performing the method (1200) of FIG. 12 to determine in some instances whether a portrait of a subject is being captured as image content or whether a person who is incidental to an image just happens to be present with a field of view of an image capture device. Accordingly, in one or more embodiments a condition precedent for steps (1206-1208) to occur is that a subject occupies a sufficient portion of a field of view of an image capture device, examples of which include at least fifty percent, at least sixty percent, at least seventy percent, or at least eighty percent. Accordingly, decision 1204 ensures steps (1206-1208) of FIG. 12 occur only when a person occupies an amount of the field of view of the image capture device capturing their image exceeding such a predefined threshold 1307.

Distance can be used as a proxy for the amount of the field of view occupied by a subject as well. In one or more embodiments, a condition precedent for steps (1206-1208) to occur is that a subject be within a predefined distance 1308 of an image capture device, examples of which include at least five feet, at least ten feet, at least fifteen feet, or at least twenty feet. Accordingly, decision 1204 ensures steps (1206-1208) of FIG. 12 occur only when a person is within a predefined distance 1308 of the image capture device capturing their image.

Turning now back to FIG. 12, optional step 1207 can include modifying the image content captured at step 1206. In one or more embodiments, step 1207 comprises applying, by one or more processors, a filter altering at least one depiction of the user of the electronic device. In one or more embodiments, step 1207 occurs prior to presenting at least some of the viewfinder content on the display at step 1208. As previously described above with reference to FIGS. 14-15, in one or more embodiments the filter alters the at least one depiction of the user by making the at least one depiction of the user take on visible characteristics associated with an animal. Illustrating by example, the filter may make a depiction of a photographer have visible characteristics of a dog or cat.

Step 1207 can apply a filter that is funny, interesting, or humorous, and is intended to capture the attention of the subject. Step 1207 can apply an augmented reality face filter in real time. This altered image created at step 1207 can then be placed on the front-facing display that is visible to a subject at step 1208 to evoke a smile or laugh by the subject. Advantageously, the image content presented on the front-facing display at step 1208 is personalized in the fact that it depicts the actual face of the photographer, even when a filter is applied at optional step 1207.

The method 1200 of FIG. 12 allows a person to capture images by activating a front-facing imager of an electronic device and directing its lens toward a subject that they wish to photograph. Thereafter, the person delivers user input causing the front-facing imager to capture an image of the subject. In the method 1200 of FIG. 12, one or more processors of the electronic device enable an image content presentation feature intended to capture the attention of a subject by presenting personalized image content depicting the face of a photographer.

At step 1206, in response to detecting an image capture operation using the front-facing imager occurring at step 1201, and when detecting the first device housing pivoting relative to a particular geometry at step 1202, step 1208 can include causing viewfinder images captured by the rear-facing imager to be displayed on the exterior display. Since the exterior display is located on the same side of the electronic device as the front-facing camera, a subject looking at the front-facing camera is then able to also see the image content presented on the exterior display.

Inclusion of optional decision 1203 and decision 1204 can result in the presentation of the image content depicting the photographer at step 1208 occurring only as certain times. Facial detection can be used in such embodiments. Embodiments of the disclosure contemplate that the presentation of image content depicting the photographer may only be desirable when a person is failing to look generally toward the electronic device. Disabling the presentation of image content when the subject is looking directly at the electronic device can conserve battery power.

Figure 16A:
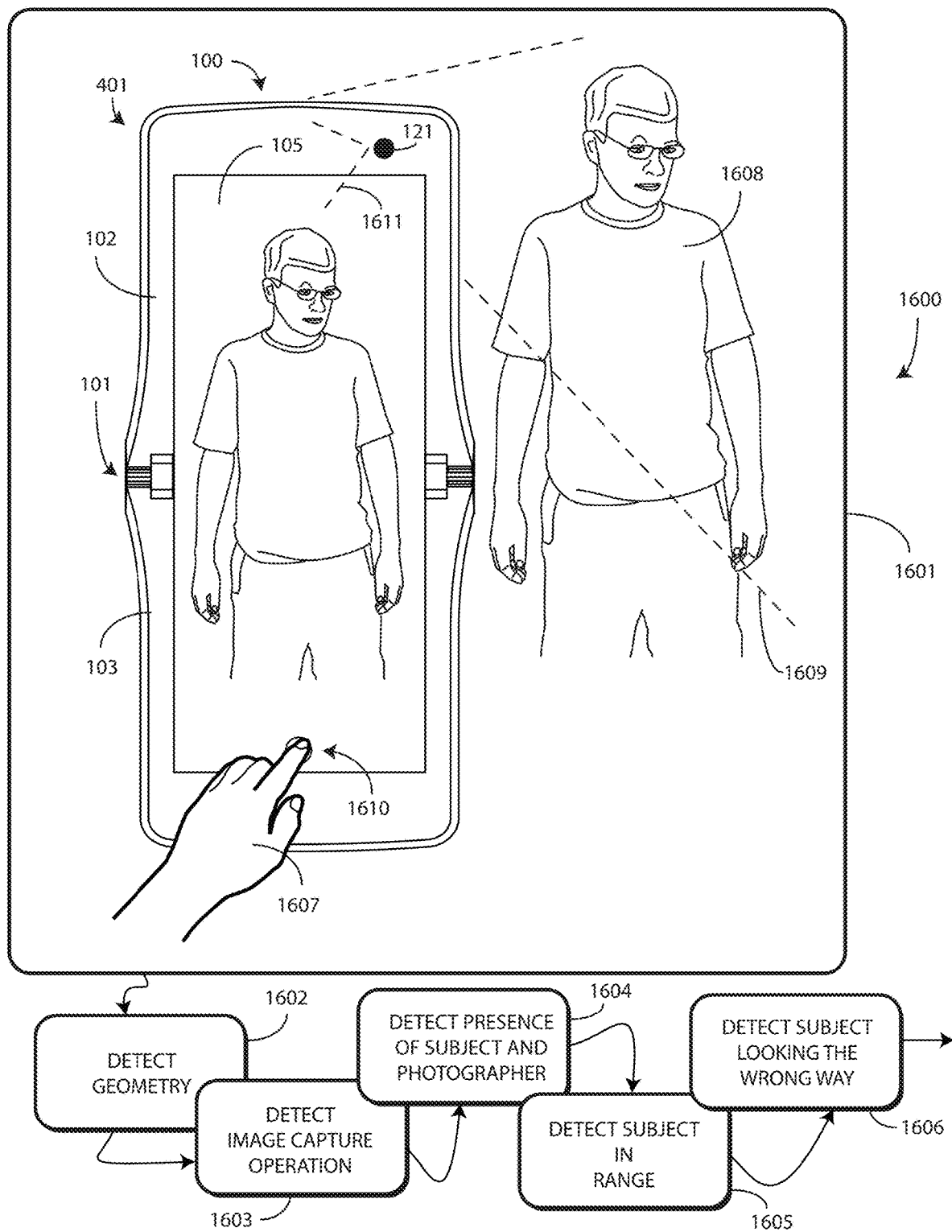
FIG. 16A illustrates one or more explanatory method steps in accordance with one or more embodiments of the disclosure.

Turning now to FIG. 16A, illustrated therein is one explanatory method 1600 of using an electronic device 100 in accordance with one or more embodiments. As shown at step 1601, a photographer 1607 has pivoted a first device housing 102 about a hinge 101 relative to a second device housing 103 to expose a rear facing display 105 and a rear-facing imager 121. This geometry is detected by one or more processors (112) of the electronic device 100 at step 1602.

At step 1601, the photographer 1607 has directed a front-facing imager (106) positioned on the opposite side of the second device housing 103 toward a subject 1608 situated within a field of view 1609 of the front-facing imager (106). The photographer 1607 has done this to capture at least one image of the subject 1609 with the front-facing imager (106). The at least one image could be a static image, a series of static images, video, or other groups of images. Additionally, the photographer 1607 is delivering user input 1610 to the rear-facing display 105 initiating an image capture operation using the front-facing imager (106), which is detected by one or more processors (112) of the electronic device 100 using one or more sensors (119) at step 1603.

At step 1604, one or more processors (112) of the electronic device 100 detect that both the subject 1608 situated within a field of view 1609 of the front-facing imager and that the photographer 1607 is withing a field of view 1611 of the rear-facing imager 121. At step 1605, the one or more processors (112) determine that the subject 1608 is within a predefined distance of the front-facing imager.

As shown at step 1601, the subject 1608 is looking in a direction other than at the front-facing imager of the electronic device 100. One or more processors (112) of the electronic device 100 detect this at step 1606.

Figure 16B:
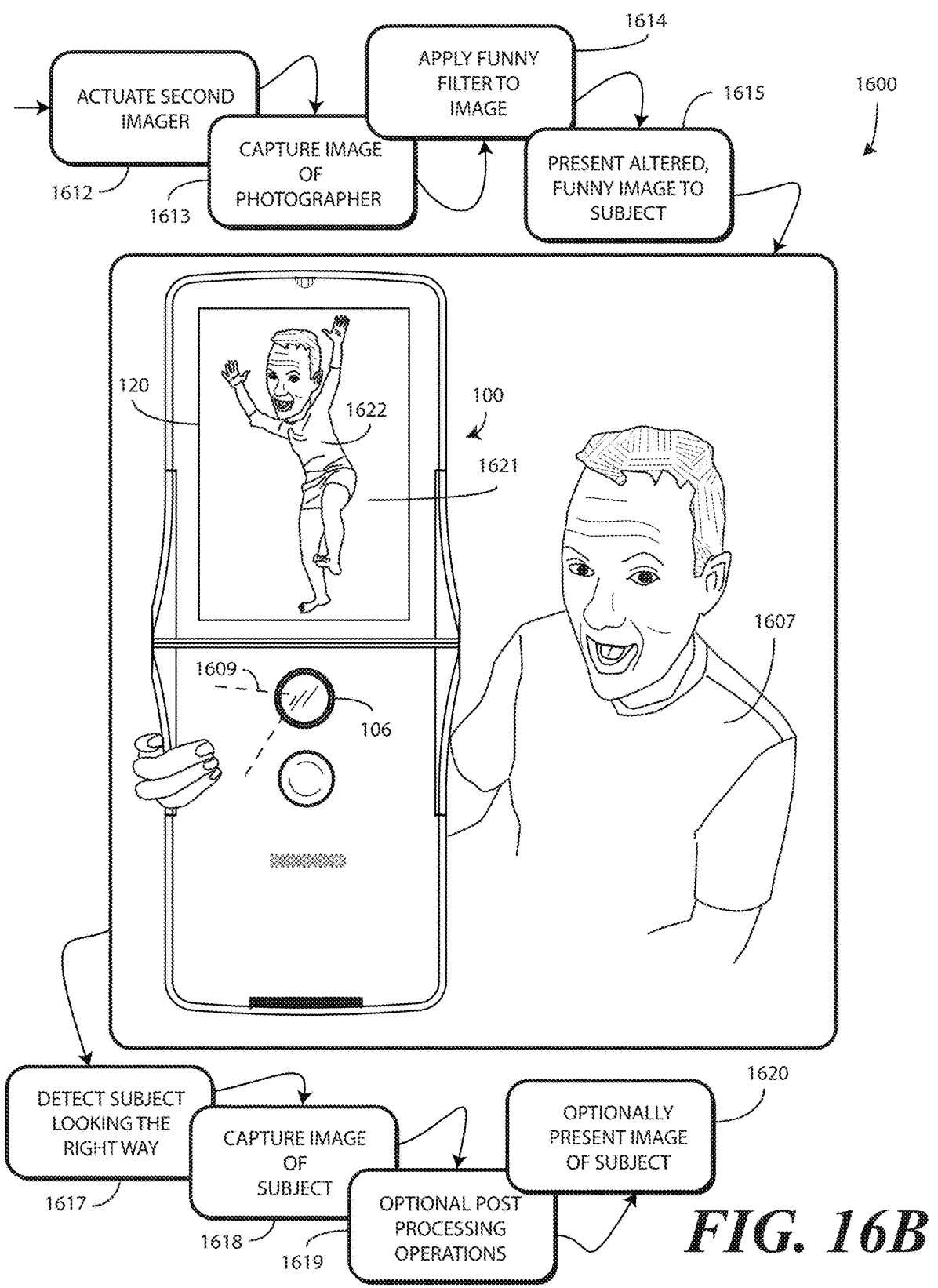
FIG. 16B illustrates one or more explanatory method steps in accordance with one or more embodiments of the disclosure.

Turning now to FIG. 16B, at step 1612 one or more processors (112) of the electronic device 100 actuate the rear-facing imager (121). At step 1613, the one or more processors (112) of the electronic device 100 cause the rear-facing imager (121) to capture image content 1621 of the photographer 1607.

At step 1614, the one or more processors (112) of the electronic device 100 apply a filter 1622 to the image content 1621. The filter 1622 in this example is a humorous body applied beneath the depiction of the photographer's head. At step 1615, the one or more processors (112) present the altered image content 1621 to the subject (1608) on the front-facing display 120.

Since the subject (1608) is situated within the field of view 1609 of the front-facing imager 106, the subject (1608) is able to see the altered image content 1621 presented on the front facing display 120. This causes the subject (1608) to turn his gaze toward the front-facing imager 106. The one or more processors (112), using the front-facing imager 106, detect that the subject (1608) is now looking at the front-facing imager 106 at step 1617. Accordingly, at step 1618 the one or more processors (112) cause the front-facing imager 106 to capture at least one image of the subject (1608).

At step 1619, the one or more processors (112) may perform one or more post processing operations on the at least one image captured at step 1618. Examples of such post processing operations include enhancing the color, tint, hue, or other features of the at least one image captured at step 1618, presenting the at least one image captured at step 1618 for review by the photographer 1607 on the rear facing display (105), and so forth. At optional step 1620, the one or more processors (112) can present the at least one image captured at step 1618 to the subject (1608) on the front-facing display 120 for review as well.

Figure 17:
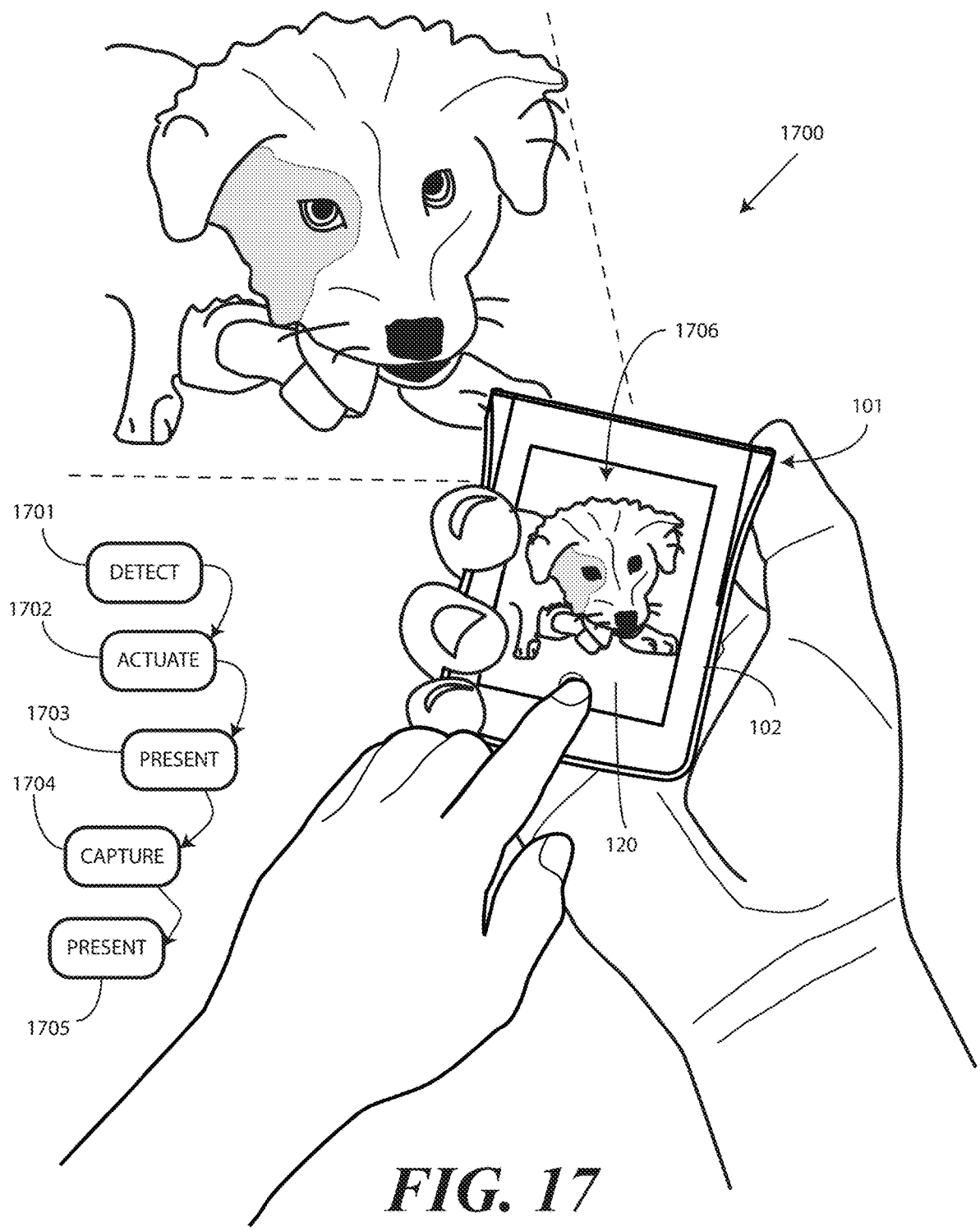
FIG. 17 illustrates still another method in accordance with one or more embodiments of the disclosure.

Turning now to FIG. 17, illustrated therein is another method 1700 in accordance with one or more embodiments of the disclosure. Recall from above that in one or more embodiments the feature of presenting image content depicting the photographer on an exterior display is enabled only when the first device housing 102 is pivoted about a hinge 101 relative to the second device housing (103) to the axially displaced open position but is precluded when the first device housing 102 is pivoted about the hinge 101 relative to the second device housing (103) to the closed position. Such is the case in FIG. 17.

At step 1701, one or more processors (112) of an electronic device 100 pivoted to the closed position detect an image capture operation occurring using an imager (106) of the electronic device 100. In this illustrative embodiment, the image capture operation comprises the receipt of a user command for the imager (106) to capture an image.

In one or more embodiments, at step 1702, the one or more processors (112) of the electronic device 100 actuate the front-facing display 120. At step 1703, the one or more processors (112) present imager viewfinder content 1706 on the front facing display 120. Accordingly, rather than presenting image content depicting the photographer on the exterior display, in this embodiment the front facing display 120 is used simply as a viewfinder since the electronic device 100 is pivoted to the closed position.

The one or more processors (112) cause the front-facing imager (106) to capture the image at step 1704. The one or more processors (112) can then present the image on the front facing display 120 for review by the photographer at step 1705.

Figure 18:
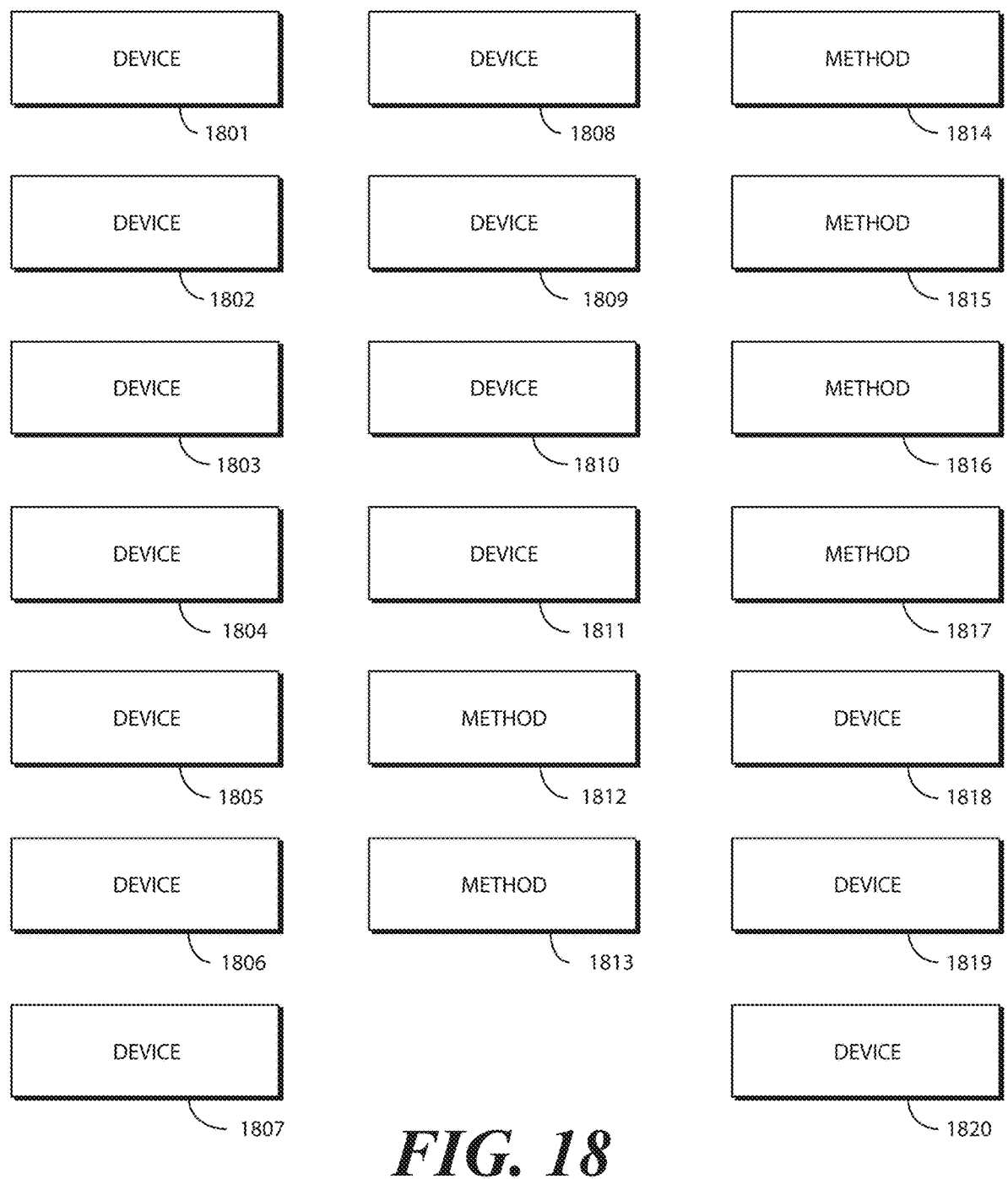
FIG. 18 illustrates various embodiments of the disclosure.

Turning now to FIG. 18, illustrated therein are various embodiments of the disclosure. The embodiments of FIG. 18 are shown as labeled boxes in FIG. 18 in accordance with 37 CFR § 1.83(a) due to the fact that the individual components of these embodiments have been illustrated in detail in FIGS. 1-17, which precede FIG. 18. Accordingly, since these items have previously been illustrated and described, their repeated illustration is no longer essential for a proper understanding of these embodiments. Thus, the embodiments are shown as labeled boxes.

Beginning at 1801, a method in an electronic device comprises detecting, with one or more processors, initiation of an image capture operation using an image capture device situated on a first surface of the electronic device and having a first field of view extending away from the first surface in a first direction. At 1801, and in response to the detecting the initiation of the image capture operation, the method comprises actuating, by the one or more processors, a second image capture device situated on a second surface of the electronic device and having a second field of view extending away from the second surface in a second direction.

At 1801, the method comprises capturing image content with the second image capture device. At 1801, the method comprises presenting, by the one or more processors, the image content on a display situated on the first surface of the electronic device. At 1801, thereafter, the method comprises capturing, by the one or more processors, at least one image with the first image capture device.

At 1802, the capturing the at least one image with the first image capture device of 1801 occurs while the image content is presented on the display. At 1803, the image capture operation of 1801 comprises imager viewfinder content from the second image capture device.

At 1804, the electronic device of 1801 comprises a deformable electronic device. At 1804, the method further comprises detecting, with one or more sensors, a geometric form factor of the deformable electronic device exposing the second image capture device and another display positioned on the second surface. At 1804, the capturing the image content with the second image capture device and the presenting the image content on the display occurs only when the second image capture device and the other display are exposed.

At 1805, the image of 1801 comprises a static image.

At 1806, the method of 1801 further comprises determining, by the one or more processors using the first image capture device and the second image capture device, that a first person is within the first field of view and a second person is within the second field of view. At 1806, the capturing the image content with the second image capture device and the presenting the image content on the display occurs only when the first person is within the first field of view and the second person is within the second field of view.

At 1807, the method of 1806 further comprises identifying, by the one or more processors using the second image capture device, the second person in the second field of view as an authorized user of the electronic device. At 1807, the capturing the image content with the second image capture device and the presenting the image content on the display occurs only when the second person is authenticated as the authorized user of the electronic device.

At 1808, the method of 1806 further comprises determining, by the one or more processors using the first image capture device, that the first person is looking in a direction other than at the first image capture device. At 1808, the capturing the image content with the second image capture device and the presenting the image content on the display occurs only when the first person is looking in the direction other than at the first image capture device.

At 1809, the method of 1808 further comprises also determining, by the one or more processors using the first image capture device, that the first person begins looking at the first image capture device. At 1809, the capturing the at least one image occurs in response to determining the first person begins looking at the first image capture device.

At 1810, the image content of 1806 comprises at least one depiction of the second person. At 1810, the method of 1806 further comprises applying a filter to the image content altering the at least one depiction of the second person prior to presenting the image content on the display. At 1811, the filter of 1810 alters the at least one depiction of the second person by making the at least one depiction of the second person have visible characteristics associated with an animal.

At 1812, an electronic device comprises a first housing portion that is pivotable relative to a second housing portion between a closed position concealing a first image capture device and a first display while leaving a second image capture device and a second display exposed, and an axially displaced open position where each of the first image capture device, the second image capture device, the first display, and the second display are exposed. At 1812, one or more sensors detect the electronic device is in the axially displaced open position.

At 1812, the electronic device comprises one or more processors detecting initiation of an image capture operation using the second image capture device. At 1812, in response, the one or more processors capture at least one image with the first image capture device and presenting the at least one image on the second display prior to capturing at least one other image using the second image capture device. At 1813, a first field of view of the first image capture device and a second field of view of the second image capture device of 1812 extend in substantially opposite directions.

At 1814, the one or more processors of 1812 capture the at least one image with the first image capture device and present the at least one image on the second display prior to capturing the at least one other image using the second image capture device only when the one or more processors further determine that a person is within the second field of view.

At 1815, the one or more processors of 1813 capture the at least one image with the first image capture device and present the at least one image on the second display prior to capturing the at least one other image using the second image capture device only when the one or more processors further determine that a person occupies an amount of the second field of view exceeding a predefined threshold.

At 1816, the one or more processors of 1813 capture the at least one image with the first image capture device and present the at least one image on the second display prior to capturing the at least one other image using the second image capture device only when the one or more processors further determine that a person is within the second field of view and within a predefined distance of the second image capture device.

At 1817, the one or more processors of 1813 capture the at least one image with the first image capture device and present the at least one image on the second display prior to capturing the at least one other image using the second image capture device only when the one or more processors further determine that a person is within the second field of view and looking in a direction other than at the second image capture device.

At 1818, a method in an electronic device comprises detecting, with one or more sensors, a geometric form factor of the electronic device exposing a first image capture device having a first field of view extending in a first direction and a second image capture device having a second field of view extending in a second direction that is substantially opposite to the first direction. At 1818, the method comprises capturing, by one or more processors using the first image capture device, viewfinder content.

At 1818, the method comprises presenting, by the one or more processors, at least some of the viewfinder content on a display that is visible within the second field of view. At 1818, the method comprises capturing, by the one or more processors using the second image capture device, at least one image while the at least some of the viewfinder content is visible on the display.

At 1819, the at least some of the viewfinder content of 1818 is captured by the first image capture device and presented on the display only when the one or more processors detect a person positioned within the second field of view. At 1820, the at least some of the viewfinder content of 1818 depicts a user of the electronic device. At 1820, the method further comprises applying, by the one or more processors, a filter altering at least one depiction of the user prior to presenting the at least some of the viewfinder content on the display.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    detecting, with one or more processors, initiation of an image capture operation using a first image capture device situated on a first surface of the electronic device and having a first field of view extending away from the first surface in a first direction;
    in response to the detecting the initiation of the image capture operation, actuating, by the one or more processors, a second image capture device situated on a second surface of the electronic device and having a second field of view extending away from the second surface in a second direction;
    capturing image content with the second image capture device;

presenting, by the one or more processors, the image content on a display situated on the first surface of the electronic device;

thereafter, capturing, by the one or more processors, at least one image with the first image capture device; and determining, by the one or more processors using the first image capture device and the second image capture device, that a first person is within the first field of view and a second person is within the second field of view, wherein the capturing the image content with the second image capture device and the presenting the image content on the display occurs only when the first person is within the first field of view and the second person is within the second field of view.

2. The method of claim 1, wherein the capturing the at least one image with the first image capture device occurs while the image content is presented on the display.

3. The method of claim 1, wherein the image content comprises imager viewfinder content from the second image capture device.

4. The method of claim 1, wherein the electronic device comprises a deformable electronic device, further comprising detecting, with one or more sensors, a geometric form factor of the deformable electronic device exposing the second image capture device and another display positioned on the second surface, wherein the capturing the image content with the second image capture device and the presenting the image content on the display occurs only when the second image capture device and another display are exposed.

5. The method of claim 1, wherein the image content comprises a static image.

6. The method of claim 1, wherein the at least one image depicts the first person looking at the first image capture device.

7. The method of claim 1, further comprising identifying, by the one or more processors using the second image capture device, the second person in the second field of view as an authorized user of the electronic device, wherein the capturing the image content with the second image capture device and the presenting the image content on the display occurs only when the second person is authenticated as the authorized user of the electronic device.

8. The method of claim 1, further comprising determining, by the one or more processors using the first image capture device, that the first person is looking in a direction other than at the first image capture device, wherein the capturing the image content with the second image capture device and the presenting the image content on the display occurs only when the first person is looking in the direction other than at the first image capture device.

9. The method of claim 8, further comprising also determining, by the one or more processors using the first image capture device, that the first person begins looking at the first image capture device, wherein the capturing the at least one image occurs in response to determining the first person begins looking at the first image capture device.

10. The method of claim 1, wherein the image content comprises at least one depiction of the second person, further comprising applying a filter to the image content altering the at least one depiction of the second person prior to presenting the image content on the display.

11. The method of claim 10, wherein the filter alters the at least one depiction of the second person by making the at least one depiction of the second person have visible characteristics associated with an animal.

12. An electronic device, comprising:
a first housing portion that is pivotable relative to a second housing portion between:
a closed position concealing a first image capture device and a first display while leaving a second image capture device and a second display exposed; and
an axially displaced open position where each of the first image capture device, the second image capture device, the first display, and the second display are exposed;
one or more sensors detecting the electronic device is in the axially displaced open position; and
one or more processors detecting initiation of an image capture operation using the second image capture device and, in response, capturing at least one image with the first image capture device and presenting the at least one image on the second display prior to capturing at least one other image using the second image capture device; and
wherein:
a first field of view of the first image capture device and a second field of view of the second image capture device extend in substantially opposite directions; and
the one or more processors capture the at least one image with the first image capture device and present the at least one image on the second display prior to capturing the at least one other image using the second image capture device only when the one or more processors further determine that a person is within the second field of view.

13. The electronic device of claim 12, wherein the first field of view of the first image capture device and the second field of view of the second image capture device extend in the substantially opposite directions when the electronic device is deformed.

14. The electronic device of claim 13, wherein the first image capture device and the second image capture device are situated beneath the first display.

15. The electronic device of claim 12, wherein the one or more processors capture the at least one image with the first image capture device and present the at least one image on the second display prior to capturing the at least one other image using the second image capture device only when the one or more processors further determine that the person is within the second field of view and occupies an amount of the second field of view exceeding a predefined threshold.

16. The electronic device of claim 12, wherein the one or more processors capture the at least one image with the first image capture device and present the at least one image on the second display prior to capturing the at least one other image using the second image capture device only when the one or more processors further determine that the person is within the second field of view and within a predefined distance of the second image capture device.

17. The electronic device of claim 12, wherein the one or more processors capture the at least one image with the first image capture device and present the at least one image on the second display prior to capturing the at least one other image using the second image capture device only when the one or more processors further determine that the person is within the second field of view and looking in a direction other than at the second image capture device.

18. A method in an electronic device, the method comprising:
detecting, with one or more sensors, a geometric form factor of the electronic device exposing a first image capture device having a first field of view extending in a first direction and a second image capture device having a second field of view extending in a second direction that is substantially opposite to the first direction;

capturing, by one or more processors using the first image capture device, viewfinder content;

presenting, by the one or more processors, at least some of the viewfinder content on a display that is visible within the second field of view; and capturing, by the one or more processors using the second image capture device, at least one image while the at least some of the viewfinder content is visible on the display;

wherein the at least some of the viewfinder content is captured by the first image capture device and presented on the display only when the one or more processors detect a person positioned within the second field of view.

19. The method of claim 18, wherein the at least some of the viewfinder content depicts the person.

20. The method of claim 18, wherein the at least some of the viewfinder content depicts a user of the electronic device, further comprising applying, by the one or more processors, a filter altering at least one depiction of the user prior to presenting the at least some of the viewfinder content on the display.

* * * * *